United States Patent
Kaliski, Jr.

(10) Patent No.: US 11,025,407 B2
(45) Date of Patent: Jun. 1, 2021

(54) HASH-BASED DIGITAL SIGNATURES FOR HIERARCHICAL INTERNET PUBLIC KEY INFRASTRUCTURE

(71) Applicant: VERISIGN, INC., Reston, VA (US)

(72) Inventor: Burton S. Kaliski, Jr., McLean, VA (US)

(73) Assignee: VERISIGN, INC., Reston, VA (US)

( * ) Notice: Subject to any disclaimer, the term of this patent is extended or adjusted under 35 U.S.C. 154(b) by 83 days.

(21) Appl. No.: 15/612,561

(22) Filed: Jun. 2, 2017

(65) Prior Publication Data

US 2017/0272250 A1    Sep. 21, 2017

Related U.S. Application Data

(63) Continuation-in-part of application No. 14/959,281, filed on Dec. 4, 2015.

(51) Int. Cl.
*H04L 9/32* (2006.01)
*H04L 9/00* (2006.01)
(Continued)

(52) U.S. Cl.
CPC ............. *H04L 9/006* (2013.01); *H04L 9/007* (2013.01); *H04L 9/3239* (2013.01);
(Continued)

(58) Field of Classification Search
CPC ..... H04L 61/1511; H04L 9/32; H04L 9/3247; H04L 9/3236; H04L 9/006; H04L 9/3265;
(Continued)

(56) References Cited

U.S. PATENT DOCUMENTS

| 5,016,274 A | 5/1991 | Micali et al. |
| 6,085,320 A * | 7/2000 | Kaliski, Jr. ............. G06F 21/33 |
| | | 713/168 |

(Continued)

OTHER PUBLICATIONS

Bernstein et al., "SPHINCS: practical stateless hash-based signatures," In Annual International Conference on the Theory and Applications of Cryptographic Techniques. Springer, 2015, 33 pages.
(Continued)

*Primary Examiner* — Amie C. Lin
(74) *Attorney, Agent, or Firm* — MH2 Technology Law Group, LLP

(57) ABSTRACT

Techniques for signing internet data are disclosed. The techniques include accessing a plurality of internet data records. The techniques also include generating, using at least one electronic processor, leaf nodes from the plurality of internet data records, and constructing a recursive hash tree from the plurality of leaf nodes. The techniques also include deriving information sufficient to validate the root node, and publishing, in an internet public key infrastructure (PKI) as a synthesized public key, the information sufficient to validate the root node. The techniques also include providing, through the internet and as a signature on at least one of the plurality of internet data records, validation data including sibling path data from the recursive hash tree, such that an internet client validates the at least one of the internet data records using at least the validation data and the synthesized public key.

22 Claims, 13 Drawing Sheets

(51) Int. Cl.
*H04L 29/12* (2006.01)
*H04L 29/06* (2006.01)
*G06F 16/22* (2019.01)

(52) U.S. Cl.
CPC .......... *H04L 9/3247* (2013.01); *H04L 9/3265* (2013.01); *H04L 61/1511* (2013.01); *H04L 63/123* (2013.01); *G06F 16/2255* (2019.01)

(58) Field of Classification Search
CPC ..... H04L 9/3239; H04L 63/123; H04L 9/007; H04L 9/0836; H04L 63/12; H04L 2209/38; G06F 16/2255; G06F 16/2246
See application file for complete search history.

(56) References Cited

U.S. PATENT DOCUMENTS

| | | | |
|---|---|---|---|
| 6,097,811 | A | 8/2000 | Micali |
| 6,301,659 | B1 | 10/2001 | Micali |
| 2005/0114666 | A1* | 5/2005 | Sudia ............... H04L 9/3236 713/175 |
| 2007/0033419 | A1* | 2/2007 | Kocher ............... G06F 21/10 713/193 |
| 2008/0260160 | A1 | 10/2008 | Moreau |
| 2010/0251351 | A1* | 9/2010 | Teranishi ............ G06F 21/6245 726/7 |
| 2012/0117621 | A1 | 5/2012 | Kondamuru et al. |
| 2012/0284505 | A1 | 11/2012 | Smith et al. |
| 2013/0083926 | A1* | 4/2013 | Hughes ............... H04L 9/0836 380/278 |
| 2014/0149740 | A1* | 5/2014 | Sato ............... H04L 9/006 713/158 |
| 2014/0282887 | A1 | 9/2014 | Kaminsky et al. |
| 2016/0197898 | A1* | 7/2016 | Hozza ............... H04L 63/0442 713/168 |

OTHER PUBLICATIONS

Bindel et al., "Transitioning to a Quantum-Resistant Public Key Infrastructure," May 24, 2017. http://eprint.iacr.org/2017/460, pp. 1-27.

Buchmann et al., "XMSS—A Practical Forward Secure Signature Scheme based on Minimal Security Assumptions," In International Workshop on Post-Quantum Cryptography. Springer, 2011, pp. 1-26.

Cooper et al., "Internet X.509 Public Key Infrastructure Certificate and Certificate Revocation List (CRL) Profile," May 2008, pp. 1-151.

Ducas et al., "Lattice Signatures and Bimodal Gaussians," In Advances in Cryptology: CRYPTO 2013, ResearchGate, pp. 40-56, Springer, 2013.

Laurie et al., "IETF RFC 6962: Certificate Transparency," Jun. 2013, 27 pages.

McGrew et al., "Hash-Based Signatures, Internet-Draft draft-mcgrew-hash-sigs-06," Mar. 5, 2017, pp. 1-44.

Merkle, "Secrecy, Authentication and Public Key Systems," Standford University Technical Report No. 1979-1, Jun. 1979, pp. 1-182.

Nakamoto, "Bitcoin: A Peer-to-Peer Electronic Cash System," 2008, pp. 1-9.

Oasis, Security Assertion Markup Language (SAML) 2.0, Mar. 15, 2005, 66 pages.

Pavlovski et al., "Efficient Batch Signature Generation Using Tree Structures," International Workshop on Cryptographic Techniques and E-Commerce, CrypTEC. vol. 99. 1999, 8 pages.

Santesson et al, "IETF RFC 6960: X.509 Internet Public Key Infrastructure Online Certificate Status Protocol—OCSP Abstract," Jun. 2013, pp. 1-41.

Even et al., "On-line/off-line digital signatures." In Advances in Cryptology: Crypto' 89, pp. 263-277. Springer, 1990.

Kocher, "On certificate revocation and validation." In Financial Cryptography. Springer, 1998.

Extended European Search Report dated Apr. 18, 2017, European Application No. 16202042.4, pp. 1-7.

Burton S. Kaliski, Jr., "Rethinking Adoption of Hash Signatures", ETSI 2nd Quantum-Safe Cryptography Workshop, Oct. 6, 2014, pp. 1-18.

R. Arends et al., "Resource Records for the DNS Security Extensions", Network Working Group RFC 1717, Internet Society, 2005, pp. 1-29.

Michael Szydlo, "Recent Improvements in the Efficient Use of Merkle Trees: Additional Options for the Long Term", RSA Laboratories, Mar. 10, 2004, Retrieved from the Internet: http://www.emc.com/emc-plus/rsa-labs/historical/recent-improvements-efficient-use-merkle-trees.htm, pp. 1-2.

* cited by examiner

| Internet PKI Implementation (902) | Hash-Based Public Key (904) | Synthesized Public Key (906) | Internet Data Records (908) |
|---|---|---|---|
| DNSSEC (910) | KSK (912) | ZSK (914) | RRsets (916) |
| Certification Authority (918) | Higher-Level CA Public Key (920) | Intermediate-Level CA Public Key (922) | Certificate Content (924) |
| Certificate Status Responder (926) | Certification Authority Public Key (928) | Status Responder Public Key (930) | Certificate Status Data (932) |
| CA + Certificate Status Responder (934) | Higher-Level CA Public Key (920) | Intermediate-Level CA Public Key (922) | Certificate Content (924), Status Responder Public Key (930) |
| Identity Provider (942) | Identify Provider Key Validating Key (944) | Identity Provider Public Key (946) | Authentication Assertion Content (948) |
| Code Signer (950) | Code Signer Key Validating Key (952) | Code Signer Public Key (954) | Software Image (956) |
| Payment Authority (958) | Payment Authority Key Validating Key (960) | Payment Authority Public Key (962) | Payment Transaction (964) |

Fig. 9

HASH-BASED DIGITAL SIGNATURES FOR HIERARCHICAL INTERNET PUBLIC KEY INFRASTRUCTURE

RELATED APPLICATION

This application claims priority to, and the benefit of, as a continuation-in-part, U.S. patent application Ser. No. 14/959,281 entitled "HASH-BASED ELECTRONIC SIGNATURES FOR DATA SETS SUCH AS DNSSEC" to Burton S. Kaliski, Jr., and filed on Dec. 4, 2015, which is hereby incorporated by reference in its entirety.

FIELD OF THE INVENTION

This invention relates generally to securing various internet-based services against future cryptanalysis, such as operational practical quantum computers.

BACKGROUND OF THE INVENTION

A cryptographic hash (or simply "hash" or "fingerprint") is a function that can input any of a variety of computer-interpretable objects and output a fixed-size string, e.g., a hexadecimal number. Cryptographic hashes typically have other useful properties such as preimage resistance (or "irreversibility") and collision resistance.

"Asymmetric cryptography" refers to traditional cryptography that utilizes a "key pair" consisting of a "public key" and a "private key". A message or other data may be encrypted by applying an encryption algorithm under control of the public key, and an encrypted message or other data may be decrypted by applying a conjugate decryption algorithm and under control of the private key to the encrypted message. Asymmetric cryptography includes such well-known algorithms as the Rivest-Shamir-Adleman (RSA) technique, as well as the Diffie-Hellman family of techniques. Notably, the security of such asymmetric cryptography typically relies on the difficulty of solving certain algebraic problems using standard computers.

A conventional digital signature, or simply "signature", is the result of applying a private key of an asymmetric cryptographic key pair to a computer-interpretable object. The corresponding public key is published or otherwise made available by the signing entity to the verifying party. The object may first be hashed as part of the signature process. A verifying party can verify the signature by applying the public key to the signature and comparing the result to the object or the hash of the object, or otherwise by determining that the signature corresponds to the object or its hash, depending on the scheme. If the comparison results in a match, then the signature is valid; otherwise it is invalid. Digital signatures typically confer authentication (i.e., binding the signed object to the signer), non-repudiation (i.e., assuring that the signed object was indeed signed by the signing entity), and object integrity (i.e., assuring that the signed object has not changed since being signed). The process of "validating" a signature confirms that the aforementioned properties hold for the signed object. A public/private key pair that supports digital signatures may or may not also support encryption and decryption operations.

A digital certificate, or simply "certificate", is a package that includes information identifying a public key (e.g., the key itself or a hash of the key), together with information identifying the owner of the key, and a digital signature on at least some of the package contents. Certificates typically have expiration dates, which may be represented in the package contents. The digital signature is produced (i.e., signed) by a trusted party, such as a certification authority. A digital certificate provides any entity that trusts the party that signed the certificate with the ability to validate that the signed public key is indeed associated with the party identified in the certificate. Thus, certificates are used to protect data, encrypt transactions, and enable secure communications, among other uses. An example standard for certificates is the X.509 standard, promulgated by the International Telecommunications Union's Standardization sector.

A certification authority is an entity that provides digital certificates. Thus, certificate authorities are trusted third parties, which verify the identities of parties engaged in some communication. Certificate authorities may issue many certificates per minute. Certification authorities are identified with the computer servers that provide the certificates.

A certificate status responder is an entity that provides, on demand, the status of a digital certificate, e.g., as valid, expired, or revoked. By way of explanatory example, a first user may wish to communicate securely with a second user, e.g., by using the second user's public key to encrypt a message or other data. However, the first user may wish to verify that the second user's public key is authentic and actually associated with the second user. To do this, the first user obtains a certificate for the public key of the second user. However, the certificate, which is signed by a trusted third-party certification authority, may have expired, been revoked, or otherwise be invalid. Verifying the certification authority's signature on the certificate does not necessarily verify the current validity of the certificate. The first user thus wishes to verify the current status of the second user's certificate. To do so, the first user utilizes a certificate status responder. The certificate status responder receives a status request that includes an identification of the certificate in question, e.g., in the form of a serial number. The certificate status responder may receive the request from the first user, or from the second user according to a so-called "stapling" approach. Based on the serial number or other certificate identifier, the certificate status responder may retrieve a status of the certificate from the certification authority that issued it, or from its own records (e.g., if the certificate status responder is itself also a certification authority that issued the second user's certificate). The certificate status responder generates a response that includes information indicating the status of the second user's certificate and a signature produced by the certificate status responder's private key. The certificate status responder then returns the response to the requesting party. If the requesting party is the second user per a stapling approach, then the second user includes the response in an initial communication with the first user; otherwise, the certificate status responder returns the status certificate to the first user. The first user then uses the public key of the certificate status responder to verify the signature on the response, thereby obtaining a validated status of the second user's certificate. An example certificate status responder protocol is Online Certificate Status Protocol ("OCSP"). A certificate status responder is identified herein with the hardware computer servers that perform the responses.

An "identity provider" is an entity that provides a user's online identity to an online application. By way of explanatory example, a user may wish to access an online resource, such as a service. The user directs the user's computer to the online resource, e.g., by entering or clicking on a URL in a browser. The online resource redirects the user's computer to an identity provider. The user's computer, e.g., a browser executing thereon, may have an open session active with the identify provider from a previous login to the identity provider, or the user may log in to the identity provider at this point. The identify provider generates a package of information that includes an identifier of the user's identity, adds a signature, and provides it to the user's computer or to the online resource. The user's browser may then redirect back to the online resource. The online resource then validates the signature. At this point, the user can access the online resource without separately logging in to it. An example known identity provider protocol is associated with the Security Assertion Markup Language ("SAML"). An identity provider is identified herein with the server computers through which the identity provider provides its services.

A "code signer" is an entity that provides signatures on computer code, such as software images, executables and scripts. A user wishing to execute the code may confirm that the code has not been altered before executing by validating the signature. Typically, a developer provides the code to a coder signer server computer (which is identified with the code signer entity). The code signer signs the code (or an image of the code, such as a hash) and returns the signature to the developer. Later, a user wishing to validate the code can authenticate the signature using the code signer's public key. A code signer is identified herein with the server computers through which the code signer provides its services.

A "payment authority" is an entity that provides signatures on online payments. A payer may wish to have his or her payment to a payee validated. The payer interacts with a payment authority, which signs the payment to the payee. In some embodiments, the payer itself may be the payment authority. In others, a trusted third party, such as a payment service, may be the payment authority. Later, any party can validate the transaction by confirming the signature on the payment. A payment authority is identified herein with the server computers through which the payment authority provides its services.

The Domain Name System (DNS) is a hierarchical distributed naming system for resources, such as those provided by computer servers, connected to the internet. It associates domain names to Internet Protocol (IP) addresses and other related information. The DNS thus allows computers and humans to access networked resources using names.

The DNS is organized into "zones", the basic unit of organization of authoritative name data for the DNS. The DNS relies on extensive delegation of such authority. In that respect, the term "child" refers to an entity of record to which a "parent" entity delegates name resolution authority for a domain, or portion thereof. The terms "parent" and "child" are also generally identified with the respective zones.

SUMMARY

According to some embodiments, a method of electronically signing internet data records is provided. The method includes accessing, using at least one electronic processor, a plurality of internet data records; generating, using at least one electronic processor, a plurality of leaf nodes from the plurality of internet data records; constructing, using at least one electronic processor, a recursive hash tree from the plurality of leaf nodes, where the recursive hash tree includes a plurality of nodes, the plurality of nodes including a root node and the plurality of leaf nodes, where each node of the plurality of nodes includes either a leaf node or a hash of data including child nodes; deriving, using at least one electronic processor, information sufficient to validate the root node; publishing, in an internet public key infrastructure (PKI) as a synthesized public key, the information sufficient to validate the root node; and providing, through the internet and as a signature on at least one of the plurality of internet data records, validation data including sibling path data from the recursive hash tree, where an internet client validates the at least one of the internet data records using at least the validation data and the synthesized public key.

Various optional features of the above embodiments include the following. The generating a plurality of leaf nodes may include assembling the plurality of internet data records into leaf node batches using at least one of adaptive batch assembly and predictive batch assembly. The method may include obtaining a signature on the synthesized public key; and publishing on the internet a public key for validating the signature on the synthesized public key. The obtaining a signature on the synthesized public key may include obtaining a hash-based signature on the synthesized public key, where the obtaining a hash-based signature includes generating a second recursive hash tree including a leaf node including a set of random numbers; the method may further include providing the hash-based signature to at least one entity over the internet; the method may further include deriving information sufficient to validate a root node of the second recursive hash tree; and the publishing on the internet a public key for validating the signature on the synthesized public key may include publishing on the internet, as a public key for validating the hash-based signature, the information sufficient to validate a root node of the second recursive hash tree. The publishing, in an internet PKI as a synthesized public key, the root node, and the providing, through the internet and as a signature on at least one of the plurality of internet data records, validation data including sibling path data from the recursive hash tree, may be performed by a certification authority; the plurality of internet data records may include a plurality of digital certificate contents; the plurality of leaf nodes may include cryptographic hashes of the plurality of digital certificate contents; the synthesized public key may be published as an intermediate-level certification authority public key; and the public key for validating the signature on the synthesized public key may be published as a higher-level certification authority public key. The method may include accessing a plurality of electronically stored Online Certificate Status Protocol (OCSP) certificate status data records; generating a second plurality of leaf nodes from the plurality of OCSP certificate status data records; constructing a third recursive hash tree from the second plurality of leaf nodes, where the third recursive hash tree includes a second plurality of nodes, the second plurality of nodes including a third root node and the second plurality of leaf nodes, where each node of the second plurality of nodes includes either a leaf node or a hash of data including child nodes; deriving information sufficient to validate the third root node; publishing, in the internet PKI and as a synthesized OCSP responder public key, the information sufficient to validate the third root node; and providing, over the internet and as a signature on at least one of the plurality of OCSP certificate status data records, second validation data including sibling path data from the third recursive hash tree, where an OCSP client validates the at least one of the plurality of OCSP certificate status data records using at least the second validation data and the synthesized OCSP responder public key; where the plurality of internet data records further include the OCSP responder public key. The publishing, in an internet PKI as a synthesized public key, the root node, and the providing, through the internet and as a signature on at least one of the plurality of internet data records, validation data including sibling path data from the recursive hash tree, may be performed by an Online Certificate Status Protocol (OCSP) responder; the plurality of internet data records may include a plurality of OCSP certificate status data records; the plurality of leaf nodes may include cryptographic hashes of the plurality of OCSP certificate status data records; the synthesized public key may be published as an OCSP responder public key; and the public key for validating the signature on the synthesized public key may be published as a certification authority public key. The plurality of OCSP certificate status data records may include multiple inconsistent status indicators. The publishing, in an internet PKI as a synthesized public key, the root node, and the providing, through the internet and as a signature on at least one of the plurality of internet data records, validation data including sibling path data from the recursive hash tree, may be performed by an identity provider; the plurality of internet data records may include a plurality of authentication assertion contents; the plurality of leaf nodes may include cryptographic hashes of the plurality of authentication assertion contents; the synthesized public key may be published as an identity provider public key; and the public key for validating the signature on the synthesized public key may be published as an identity provider key validating key. The publishing, in an internet PKI as a synthesized public key, the root node, and the providing, through the internet and as a signature on at least one of the plurality of internet data records, validation data including sibling path data from the recursive hash tree, may be performed by a code signer; the plurality of internet data records may include a plurality of software images; the plurality of leaf nodes may include cryptographic hashes of the plurality of software images; the synthesized public key may be published as a code signing public key; and the public key for validating the signature on the synthesized public key may be published as a code signing key validating key. The publishing, in an internet PKI as a synthesized public key, the root node, and the providing, through the internet and as a signature on at least one of the plurality of internet data records, validation data including sibling path data from the recursive hash tree, may be performed by a payment authority; the plurality of internet data records may include a plurality of payment transaction data; the plurality of leaf nodes may include cryptographic hashes of the plurality of payment transaction data; the synthesized public key may be published as a payment authority public key; and the public key for validating the signature on the synthesized public key may be published as a payment authority key validating key.

According to various embodiments, a system for electronically signing internet data records is provided. The system includes at least one electronic processor programmed to perform: accessing a plurality of internet data records; generating a plurality of leaf nodes from the plurality of internet data records; constructing a recursive hash tree from the plurality of leaf nodes, where the recursive hash tree includes a plurality of nodes, the plurality of nodes including a root node and the plurality of leaf nodes, where each node of the plurality of nodes includes either a leaf node or a hash of data including child nodes; deriving information sufficient to validate the root node; and publishing, in an internet public key infrastructure (PKI) as a synthesized public key, the information sufficient to validate the root node; and at least one electronic server computer configured to perform providing, through the internet and as a signature on at least one of the plurality of internet data records, validation data including sibling path data from the recursive hash tree, where an internet client validates the at least one of the internet data records using at least the validation data and the synthesized public key.

Various optional features of the above embodiments include the following. The generating a plurality of leaf nodes may include assembling the plurality of internet data records into leaf node batches using at least one of adaptive batch assembly and predictive batch assembly. The at least one electronic processor may be further programmed to perform: obtaining a signature on the synthesized public key; and publishing on the internet a public key for validating the signature on the synthesized public key. The obtaining a signature on the synthesized public key may include obtaining a hash-based signature on the synthesized public key, where the obtaining a hash-based signature includes generating a second recursive hash tree including a leaf node including a set of random numbers; the at least one electronic processor may be further programmed to perform providing the hash-based signature to at least one entity over the internet; the at least one electronic processor may be further programmed to perform deriving information sufficient to validate a root node of the second recursive hash tree; and the publishing on the internet a public key for validating the signature on the synthesized public key may include publishing on the internet, as a public key for validating the hash-based signature, the information sufficient to validate a root node of the second recursive hash tree. The publishing, in an internet PKI as a synthesized public key, the root node, and the providing, through the internet and as a signature on at least one of the plurality of internet data records, validation data including sibling path data from the recursive hash tree, may be performed by a certification authority; the plurality of internet data records may include a plurality of digital certificate contents; the plurality of leaf nodes may include cryptographic hashes of the plurality of digital certificate contents; the synthesized public key may be published as an intermediate-level certification authority public key; and the public key for validating the signature on the synthesized public key may be published as a higher-level certification authority public key. The at least one electronic processor may be further programmed to perform: accessing a plurality of electronically stored Online Certificate Status Protocol (OCSP) certificate status data records; generating a second plurality of leaf nodes from the plurality of OCSP certificate status data records; constructing a third recursive hash tree from the second plurality of leaf nodes, where the third recursive hash tree includes a second plurality of nodes, the second plurality of nodes including a third root node and the second plurality of leaf nodes, where each node of the second plurality of nodes includes either a leaf node or a hash of data including child nodes; deriving information sufficient to validate the third root node; and publishing, in the internet PKI and as a synthesized OCSP responder public key, the information sufficient to validate the third root node; where the at least one electronic server may be further configured to perform providing, over the internet and as a signature on at least one of the plurality of OCSP certificate status data records, second validation data including sibling path data from the third recursive hash tree, where an OCSP client validates the at least one of the plurality of OCSP certificate status data records using at least the second validation data and the synthesized OCSP responder public key; and where the plurality of internet data records may further include the OCSP responder public key. The publishing, in an internet PKI as a synthesized public key, the root node, and the providing, through the internet and as a signature on at least one of the plurality of internet data records, validation data including sibling path data from the recursive hash tree, may be performed by an Online Certificate Status Protocol (OCSP) responder; the plurality of internet data records may include a plurality of OCSP certificate status responses; the plurality of leaf nodes may include cryptographic hashes of the plurality of OCSP certificate status responses; the synthesized public key may be published as an OCSP responder public key; and the public key for validating the signature on the synthesized public key may be published as a certification authority public key. The plurality of OCSP certificate status responses may include multiple inconsistent status indicators. The publishing, in an internet PKI as a synthesized public key, the root node, and the providing, through the internet and as a signature on at least one of the plurality of internet data records, validation data including sibling path data from the recursive hash tree, may be performed by an identity provider; the plurality of internet data records may include a plurality of authentication assertion contents; the plurality of leaf nodes may include cryptographic hashes of the plurality of authentication assertion contents; the synthesized public key may be published as an identity provider public key; and the public key for validating the signature on the synthesized public key may be published as an identity provider key validating key. The publishing, in an internet PKI as a synthesized public key, the root node, and the providing, through the internet and as a signature on at least one of the plurality of internet data records, validation data including sibling path data from the recursive hash tree, may be performed by a code signer; the plurality of internet data records may include a plurality of software images; the plurality of leaf nodes may include cryptographic hashes of the plurality of software images; the synthesized public key may be published as a code signing public key; and the public key for validating the signature on the synthesized public key may be published as a code signing key validating key. The publishing, in an internet PKI as a synthesized public key, the root node, and the providing, through the internet and as a signature on at least one of the plurality of internet data records, validation data including sibling path data from the recursive hash tree, may be performed by a payment authority; the plurality of internet data records may include a plurality of payment transaction data; the plurality of leaf nodes may include cryptographic hashes of the plurality of payment transaction data; the synthesized public key may be published as a payment authority public key; and the public key for validating the signature on the synthesized public key may be published as a payment authority key validating key.

Computer readable media embodiments for each of the disclosed system and method embodiments are also contemplated.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 9 depicts a table summarizing various implementation contexts and details for providing quantum-computer-resistant hierarchical digital signatures in an internet public key infrastructure environment;

DESCRIPTION OF THE EMBODIMENTS

Figure 1:
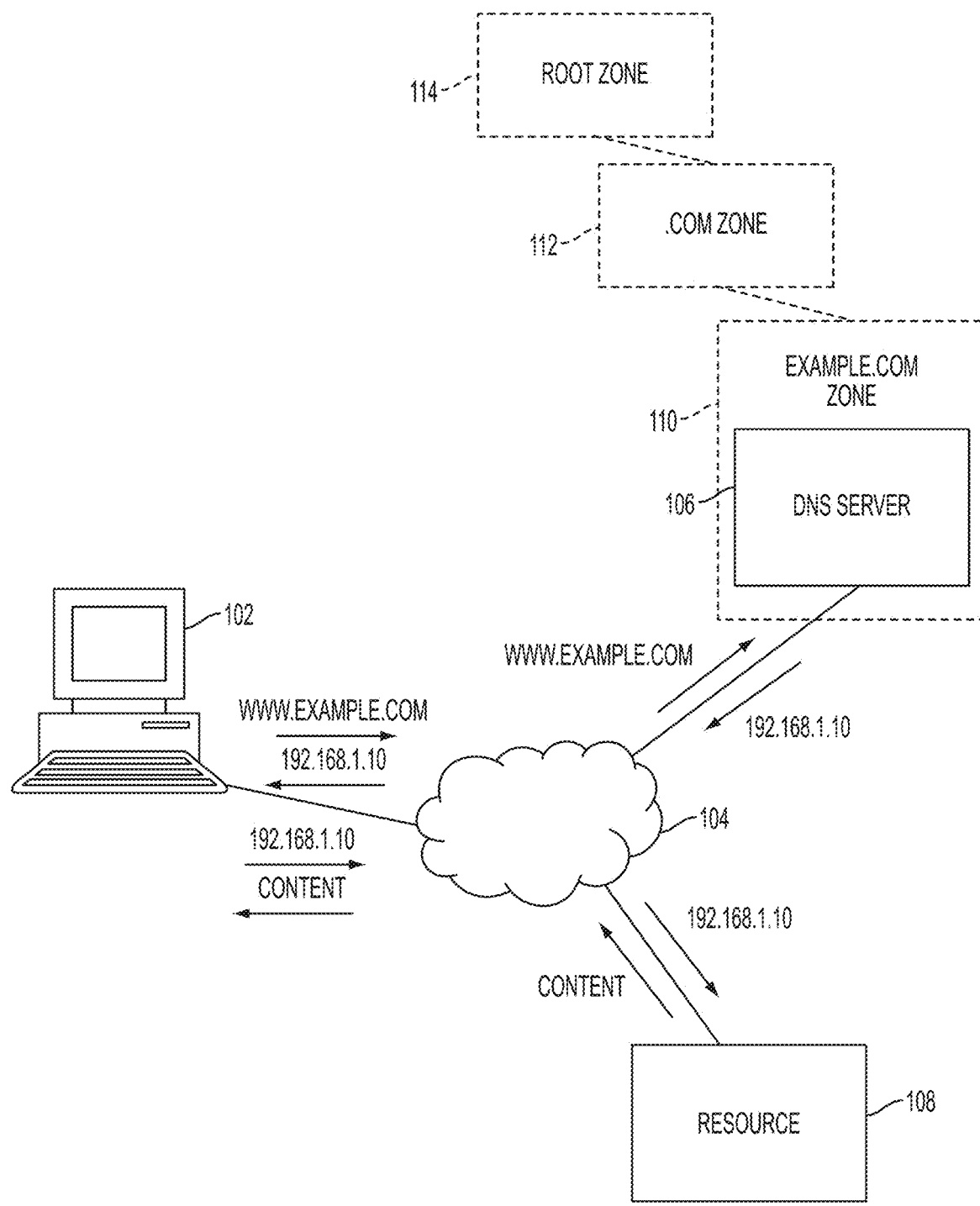
FIG. 1 is a schematic diagram depicting an example DNS interaction with a client.

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

I. Introduction

Some embodiments provide an optimized technique for integrating hash-based signatures into the Domain Name System Security Extensions (DNSSEC). DNSSEC currently specifies three main families of algorithms for signing DNS records: RSA, digital signature algorithm (DSA), and elliptic curve DSA (ECDSA). However, these algorithms may be vulnerable to potential advances in cryptanalysis, including the possible future construction of a practical quantum computer. Known hash-based digital signature techniques may be resistant to such advances; however, such signatures are typically much, much larger than those in the current families, such that implementation of known prior art hash-based digital signatures may be impractical. While signature size may not be a significant issue when adding signatures to relatively large objects such as executable files, it can be an issue when the objects are relatively small, such as DNS resource records, as well as when there are many records requiring signatures. Accordingly, some embodiments provide efficient and compact hash-based digital signatures to data sets, such as DNS resource records. More particularly, some embodiments provide hash-based digital signatures as a new algorithm family for DNSSEC that leverages existing DNSSEC architecture and is reasonably size-efficient, thereby ensuring the security of the DNS. Accordingly, some embodiments solve the problem of protecting the DNS from potential future cryptanalysis attacks, and are therefore unique to the environment of the internet. Nevertheless, some embodiments may be used to sign and validate arbitrary sets of information.

Some embodiments provide signature amortization without requiring architectural change to the DNS. Because known hash-based signatures are very long, some embodiments use amortization to reduce the per-signature size overhead. Rather than signing each object in a data set individually with a hash-based signature algorithm, some embodiments sign a batch of objects, e.g., a plurality of DNS resource record sets, collectively. This approach works particularly well if updates to a dataset are done on a predictable schedule, e.g., all objects are updated and signed twice a day.

FIG. 1 is a schematic diagram depicting, by way of background, an example DNS interaction. Note that the interaction depicted by FIG. 1 does not necessarily involve an embodiment of the invention, nor does it explicitly depict validation or authentication mechanisms. Instead, FIG. 1 depicts an overview of one example of how DNS enables the internet to operate using domain names instead of numerical IP addresses. That is, although networked computers generally rely on numerical locators such as IP addresses, human beings are ill-equipped to memorize such locators. Accordingly, DNS enables humans to rely on easy-to-remember domain names to access resources and data. Nevertheless, the hardware and resources depicted in FIG. 1 may be modified as disclosed herein to implement an embodiment of the present invention in order to confer robust future-proof authentication and validation mechanisms to the DNS. In other words, FIG. 1 depicts a structure in which an embodiment may be implemented.

A user may operate client computer 102. The user may enter a domain name, e.g., www.example.com, in the navigation field of a web browser executing on client computer 102. Client computer 102 operates and/or contacts a recursive DNS server to look up the IP address corresponding to www.example.com. In particular, client computer 102 may send a resource record query to the recursive DNS server. For purposes of this example, the recursive DNS server lacks a resource record for www.example.com. According to the DNS protocol, the recursive DNS server may in this example query the root zone 114 for this record. By way of a DNS name server (NS) resource record, the root server points to a DNS server for .com zone 112, which provides an NS resource record that points to DNS server 106 for the zone for www.example.com, again, relying on an NS resource record. DNS server 106 responds with an appropriate DNS record (e.g., A or AAAA) that includes the requested IP address. Client computer 106 receives the resource record and parses it to extract the IP address. Client computer then contacts the IP address, which leads to resource 108, which may be a server computer. Resource 108 responds with the requested data, e.g., content.

Standing alone, the DNS protocol originally did not include any authentication mechanism for checking the validity of data sent between and from DNS servers. That is, as originally designed, DNS did not include authentication and was therefore exposed to, for example, spoofing and man-in-the-middle attacks. Accordingly, DNS benefits from security provided by the DNSSEC standard, which utilizes digital signatures to establish trust chains.

In general, a trust chain includes a directed series of trust nodes, each of which authenticates the following node in the chain. The first node in a trust chain may be authenticated by an external trust anchor. The last node may be an object that itself does not authenticate anything else, e.g., it may be a key used for encryption rather than signing, or a general-purpose object. The nodes may be implemented as computer-interpretable, electronically stored records that include authentication information, such as a digital signature, public key, digital certificate, or hash (e.g., DNS key or "DNS-KEY", delegation signer or "DS", and/or resource record signature or "RRSIG" records). A relying party who trusts only the trust anchor can authenticate every node in the chain, including an object at the end.

Trust chains are important not only because they provide straightforward, scalable ways for an application to authenticate information throughout a trust hierarchy, but also because they are transferable. An application or relying party can forward a trust chain to another relying party, who can then authenticate the same information itself without further interaction with other services.

A DNSSEC trust chain implemented using asymmetric cryptography starts with a DNSSEC root public key and extends through the DNS hierarchy via a series of digital signatures on DNS records or specific hashes of public keys. The links between nodes within a DNSSEC trust chain take the form of either a public key in one node with a signature by the corresponding private key on the next, or a hash of a public key in one node with the corresponding public key in the next. That is, the records in a DNSSEC trust chain include either public keys for verifying digital signatures on subsequent records, or hashes of public keys of subsequent records. In the former case, a node may be authenticated by verifying its digital signature with a prior node's public key. In the latter case, the node may be authenticated by comparing the hash of its content with a prior node's value.

Figure 2:
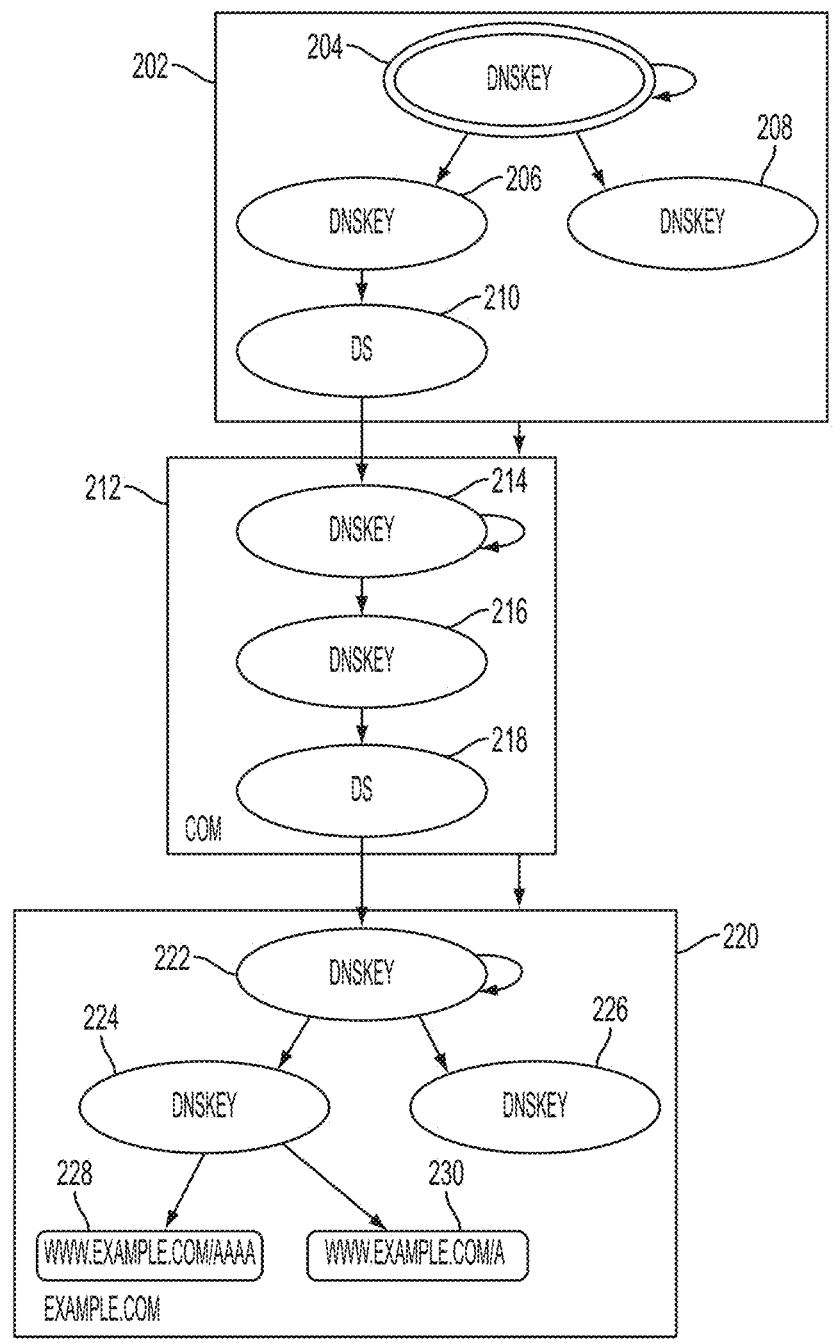
FIG. 2 is a schematic diagram of a DNSSEC trust chain.

FIG. 2 is a schematic diagram of a DNSSEC trust chain. The DNSSEC trust chains in this diagram have a length of nine nodes shown in three groups 202, 212, 220, which correspond to zones 114, 112, 110 of FIG. 1. The nodes 204, 206, 208, and 210 are for the root zone group 202 (records 206 and 208 are alternative second nodes). The first DNS-KEY record 204 is for the root zone's key-signing key (KSK). This KSK also forms part of the external trust anchor. The DNSKEY records 206, 208 are for the root zone's zone-signing keys (ZSKs), which are signed by the private key corresponding to the KSK. In the example, only DNSKEY resource record 206 continues as part of the trust chain. A separate trust chain may be continued from DNS-KEY resource record 208. The third node 210 in this group includes the delegation signer (DS) record for the .com zone's KSK. It is signed by the private key corresponding to the root zone's ZSK, and contains the hash of the .com zone's KSK (see DNSKEY resource record 214, below).

The next group of nodes extends the same pattern to the .com zone group 202. Thus, KSK DNSKEY resource record 214 authenticates ZSK DNSKEY resource record 216 via a digital signature, ZSK DNSKEY resource record 216 authenticates DNS delegation signer (DS) resource record 218 for example.com via a digital signature, and DS resource record 218 authenticates the KSK in the next group 220 by including a hash value of the KSK of the next DNSKEY resource record 222.

The last group of nodes, for the example.com zone group 220, starts with the KSK-to-ZSK pattern (222, 224, 226) and concludes with a ZSK-to-object pattern (224, 228, 230) where the ZSK record 224 authenticates the last node (228, 230) with a digital signature. The last node (228, 230) includes AAAA record 228 and A record 230 for www.example.com. Each is authenticated via a digital signature by the private key corresponding to the example.com zone's ZSK (of record 224). There are thus two trust chains of length nine nodes, one from 204 to 228, and the other from 204 to 230. Both begin with the trust chain of length eight nodes from 204 to 224.

Note that FIG. 2 reflects only a portion of the DNS records that would be present in practice. For example, not shown in FIG. 2 are the name server (NS) records that point to the name server for a zone. In practice, these are also signed by the ZSK for the zone. They are not part of the trust chain from the trust anchor to the object, but are instead part of the trust chain to the name server where the DNS records corresponding to other nodes, including the object, are obtained. Further, FIG. 2 does not show the full array of domains within each zone.

In addition, although it is typical for a zone to have both a KSK and a ZSK, where the parent zone authenticates the KSK node, the KSK authenticates the ZSK node, and the ZSK authenticates object nodes, i.e., three levels of nodes in the trust chain per zone, other arrangements are possible. For example, a zone could have just two levels of nodes, where the parent zone authenticates the ZSK node and the ZSK authenticates object nodes directly. Alternatively, a zone could have more than three levels of nodes, where a parent zone authenticates the KSK node, the KSK authenticates the ZSK node, the ZSK node authenticates another ZSK node, and the other ZSK node authenticates object nodes. By way of non-limiting examples, the techniques presented here may be applied in arrangements with three levels, with more than three levels, and in arrangements with two levels (with the modification that the parent zone authentication information, i.e., the DS record, may be updated when the ZSK changes). Furthermore, although terms such as "ZSK DNSKEY record" and "KSK DNSKEY record" are employed herein, it should be understood that the DNSKEY record is a means of representing a public key, which may take the role of a ZSK, KSK, or another public key depending on the arrangement.

Figure 3:
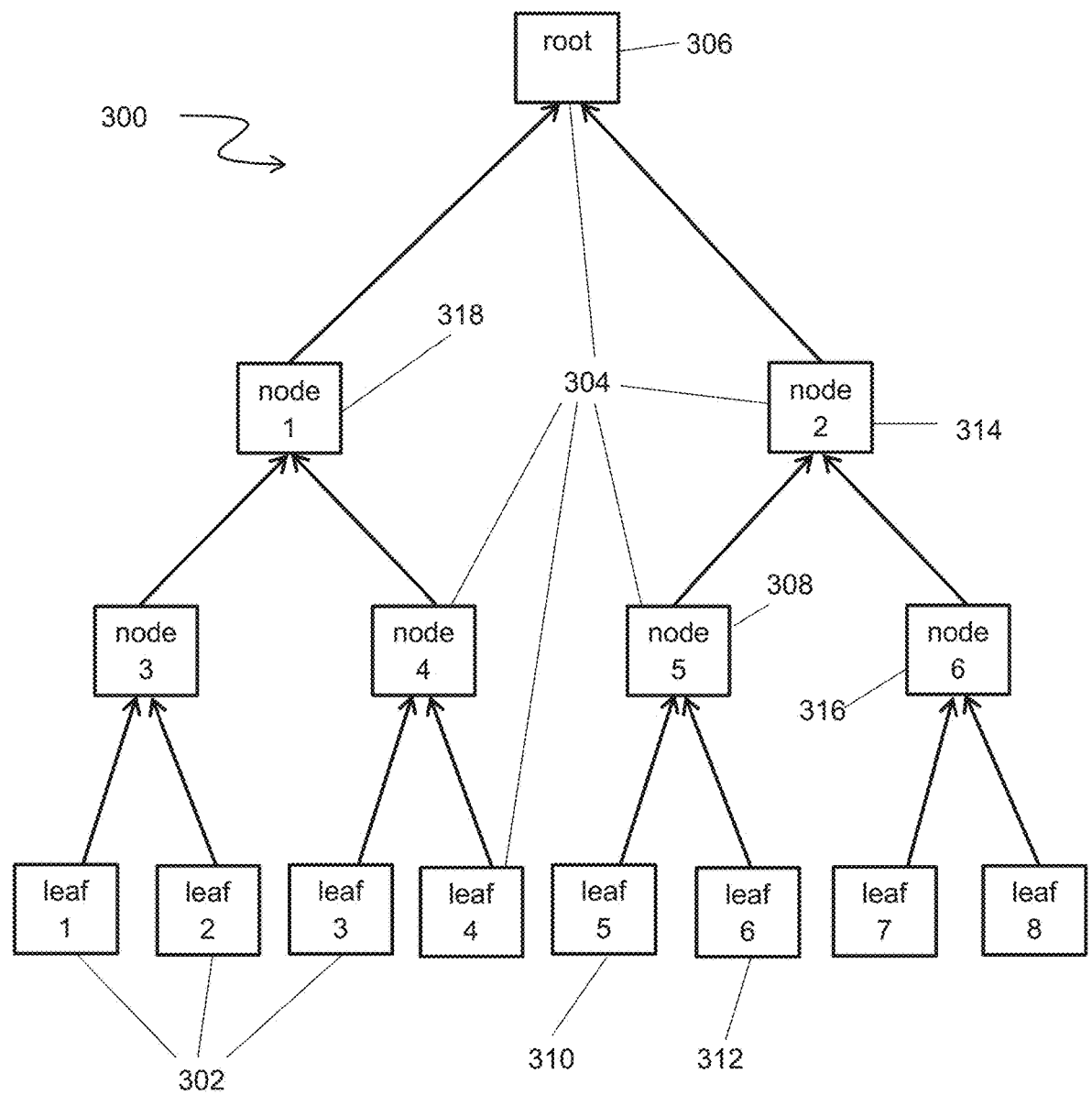
FIG. 3 is a schematic diagram of a recursive hash tree according to some embodiments.

FIG. 3 is a schematic diagram of a recursive hash tree 300 according to some embodiments, i.e., a Merkle tree. As shown in FIG. 3, and for descriptive purposes, recursive hash tree 300 has its "root node" 306 at its apex, and its "leaf nodes", e.g., 302, at its base; thus, the term "below" refers to "down" in the orientation of FIG. 3. (Of course, the orientation depicted is arbitrary, and inverted descriptions are equally applicable.) As used herein, a node's "child nodes" are the nodes that both lie below and are connected to the node at issue. Likewise, two child nodes may lie below and be connected to the nodes' common "parent" node. In general, a recursive hash tree is a (typically binary) tree, each of whose nodes is either a leaf node or a node built from a hash of its child nodes. Recursive hash trees typically have a number of leaves that is a power of two, e.g., 2, 4, 8, 16, etc., though this is not meant as a limitation.

Each leaf node (e.g., nodes 302) of recursive hash tree 300 includes data obtained by applying a secure hash function (e.g., SHA-256 from the Secure Hash Algorithm 2, "SHA-2", family), or a hash function from the SHA-3 family, to a particular object. The particular objects used to generate the leaves depend on the purpose of the recursive hash tree. For example, the method of FIG. 4 uses a recursive hash tree whose leaf nodes are hashes of DNS resource record sets, and the method of FIG. 6 uses a recursive hash tree whose leaves are hashes of sets of random numbers. In more detail, a recursive hash tree such as 300 may be used to generate signatures on objects, such as on one or more DNS resource record sets (RRset). For example, a recursive hash tree constructed from leaves built from resource record sets (RRsets) may be used to generate signatures on the RRsets (see FIG. 5) and to generate data that may be used to validate the signatures (see FIG. 6). Further, a recursive hash tree constructed from leaves built from sets of hashed random numbers may be used to generate signatures on DNSKEY RRsets (see FIG. 7) and to generate data that may be used to validate such signatures (see FIG. 8). These and other techniques are described in detail herein.

Nodes (e.g., nodes 304, 306, 308, 314, 316) of recursive hash tree 300 that are not leaf nodes (e.g., leaf nodes 302, 310, 312) are built from child nodes. More particularly, nodes above the leaf nodes are built by applying a hash function to the contents of their respective child nodes. A node location index and/or a "salt" value (e.g., an included random number) may also be input to the hash function in some embodiments, and/or a different hash function may be employed at different locations in the tree. For example, node 5 (308) contains data resulting from concatenating (or otherwise combining) the data of leaf 5 (310) with the data of leaf 6 (312), and then applying a hash function to the combined data. As another example, node 2 (314) contains data resulting from applying a hash function to the data of node 5 (308) concatenated (or otherwise combined) with the data of node 6 (316).

Digital signatures that utilize recursive hash trees (or that otherwise rely on the irreversibility of cryptographic hash functions for their security, referred to herein as "hash-based" signatures) as disclosed herein are structurally and technically different from the signatures produced by algebraically based asymmetric cryptography, and the data used to validate such signatures are structurally and technically different from the public keys used to validate signatures produced by such asymmetric cryptography. In particular, the tree-based signatures disclosed herein base their security on the irreversibility (preimage resistance) of the hash functions used in their construction. This is in contrast to signature algorithms (e.g., based on RSA, DSA, or ECDSA) that rely on the difficulty of certain algebraic problems for their security. Furthermore, as described in detail herein, the disclosed digital signatures are generated at the same time as the data that serves the same purpose of traditional public keys (e.g., signature validation). This is in contrast to traditional signature algorithms where the public key/private key pair is generated first, and then digital signatures on objects are generated under control of the private key. Here, the public key is generated from the objects directly, and there is no private key. However, in both the traditional case and the techniques disclosed herein, the signatures may be verified with the public key.

Moreover, the signature techniques disclosed herein are resistant to known quantum computer attacks, in contrast to signature techniques based on RSA, DSA, and ECDSA, which are susceptible to quantum computer attacks.

II. Hierarchical Digital Signatures for DNSSEC

Figure 4:
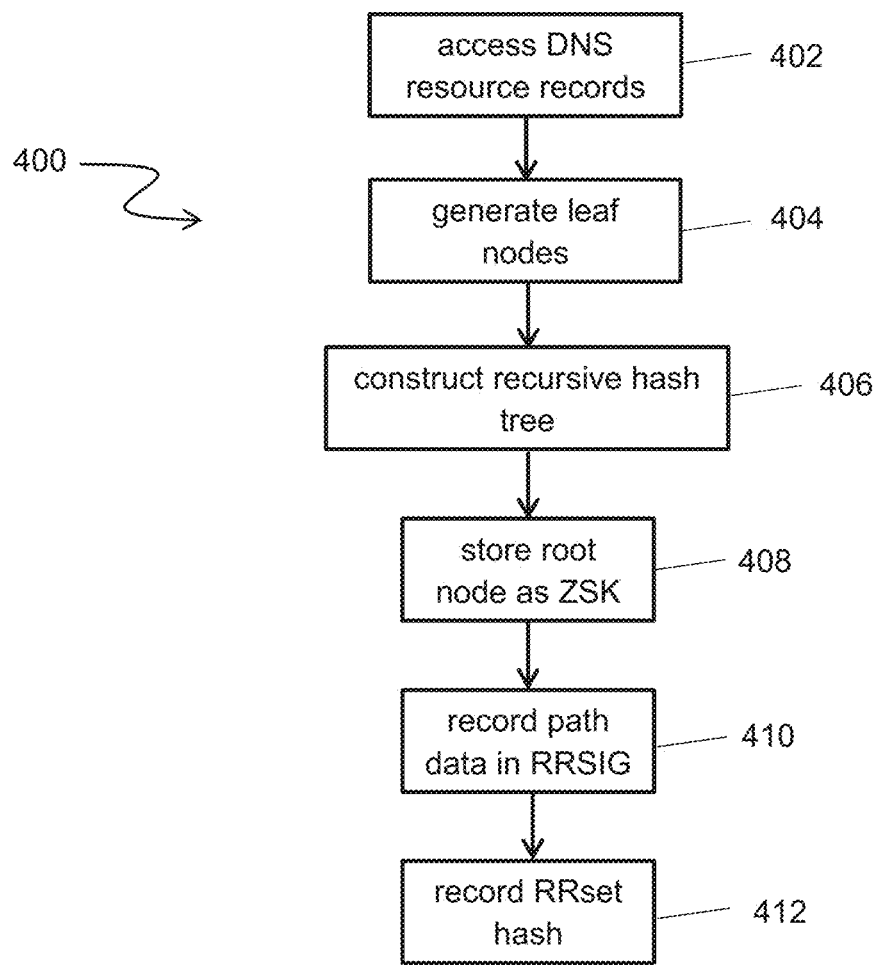
FIG. 4 is a flowchart illustrating a method of generating a zone signing key (ZSK) and signing DNS resource record sets (RRsets) according to some embodiments.

FIG. 4 is a flowchart illustrating a method 400 of generating a zone signing key (ZSK) and signing DNS resource record sets (RRset) according to some embodiments. The method may be implemented by a DNS name server (e.g., DNS server 106 of FIG. 1 or an authoritative DNS name server), or a specialized computer communicatively coupled to such a DNS name server, for example, to produce the disclosed signatures for DNS resource records. Such a specialized computer may include one or more cryptographic co-processors, for example.

At block 402, the method accesses DNS resource records. For the present technique, the method may access a resource record set (RRset), that is, a collection of resource records for a zone of a particular type (e.g., A, AAAA, DS, DNSKEY, NS, etc.). The RRset is typically one of many in a batch of RRsets are signed using this approach. The selected RRsets may be of multiple types or the same type. By way of non-limiting example, the method of FIG. 4 may sign one or more delegation signer (DS) DNSKEY RRsets, and/or one or more A RRsets, and/or one or more additional RRsets, etc. The access may include grouping records electronically into a plurality of RRsets. According to some embodiments, the number of RRsets accessed according to this block and processed according to subsequent blocks may be an integer power of two, or the method may pad the RRsets with dummy or blank RRsets such that the total number including the dummy or blank RRsets is an integer power of two. Thus, the signing operation of FIG. 4 may be applied to a batch of objects to be signed.

At block 404, the method generates leaf nodes from the accessed RRsets. This may be accomplished by applying a hash function to each of the RRsets. Suitable hash functions include cryptographic hash functions, such as by way of non-limiting example, SHA-256. The leaf nodes may be temporarily stored in volatile memory as part of this block, or they may be transferred to persistent memory. A leaf node location identifier and/or a salt value may also be input to the hash function according to some embodiments.

At block 406, the method constructs a recursive hash tree from the hashed RRset leaves. That is, the method treats the hashed RRsets as leaf nodes and builds therefrom a recursive hash tree, e.g., as shown and described in reference to FIG. 3. Thus, pairs of nodes are concatenated (or otherwise combined) and hashed (optionally together with index and/or salt inputs) in order to obtain parent nodes from child nodes as shown and described in reference to FIG. 3 until the root node is constructed. The recursive hash tree may be temporarily stored in volatile memory before storing all, or parts thereof, in persistent memory.

At block 408, the method stores the root of the recursive hash tree in a ZSK DNSKEY resource record. That is, the method stores the recursive hash tree root where a public key of an asymmetric key pair would normally be stored in a ZSK DNSKEY resource record. (In some embodiments, the method may store information sufficient to validate the root, e.g., a hash of the root, as a public key, rather than the root itself.) Details of how this data is used to validate signatures is disclosed herein, e.g., in reference to FIG. 5.

At block 410, the method stores sibling path data from the recursive hash tree in a resource record signature resource record (RRSIG). This sibling path data will serve as a signature on leaf node data as described presently and in reference to FIG. 5. The particular path data that serves as a signature on data in a certain leaf node is described in detail presently. Define a "sibling node" to a particular node in a recursive hash tree as a node that is connected to the same parent node as the particular node. Thus, for example, nodes 310 and 312 of FIG. 3 are sibling nodes because they are both connected to parent node 308. For a given leaf node in the recursive hash tree under discussion, record the data from sibling of the given leaf node, the data from the sibling of the given leaf node's parent node, the data from the sibling of the given leaf node's parent's parent, and so on, until the method records the data from the sibling node that is a direct child of the root node. These nodes are referred to as "sibling path data". Thus, for example, and in reference to FIG. 3, the following path data is recorded in an RRSIG record as the signature on leaf 5 (310): the data from leaf 6 (312), the data from node 6 (316), and the data from node 1 (318). This sibling path data may be concatenated, possibly using a formatted data structure, and stored in an RRSIG resource record. The sibling path data may also, or alternately, include an identifier of the position of the leaf node in the tree, so as to determine the "left-right" ordering of the concatenations of intermediate values during signature validation as described further next. Because the sibling path data in one signature may include common nodes with sibling path data for another signature, the path data may also be compressed by referencing the location of a common node rather than including path data directly.

At block 412, the method records a hash of the RRset that includes the resource record under consideration, i.e., the method records the leaf node itself. This data may be concatenated with the path data of block 410, and recorded in an RRSIG record. This step is optional, because the hash can be recomputed and confirmed in combination with the path, but may be useful in embodiments as a more immediate confirmation of the hash.

Blocks 410 and optional 412 of FIG. 4 may be repeated for each leaf node. Consequently, each leaf node has associated path data (and possibly a hash value) recorded in an RRSIG resource record, which serves as a signature as shown and described in reference to FIG. 5, below.

It is noteworthy that the ZSK of FIG. 4 is derived from the objects it signs, whereas in conventional signature algorithms, the ZSK is generated first and then applied to the objects it signs afterwards. Further, each batch would have its own ZSK, which may be published in a ZSK DNSKEY resource record when the batch is signed. The records in a batch may identify the appropriate ZSK as they normally do in DNSSEC, namely, in a "keyid" field in an RRSIG resource record. As a result, the method maintains architectural consistency with typical DNSSEC implementations for the purpose of signature validation: an RRset has an associated signature, stored in an RRSIG record; the signature is validated with a public key; and the public key is stored in a DNSKEY record. Thus, DNSSEC validation logic at client computer 102 does not need to be changed according to some embodiments, only the underlying signature algorithm.

Figure 5:
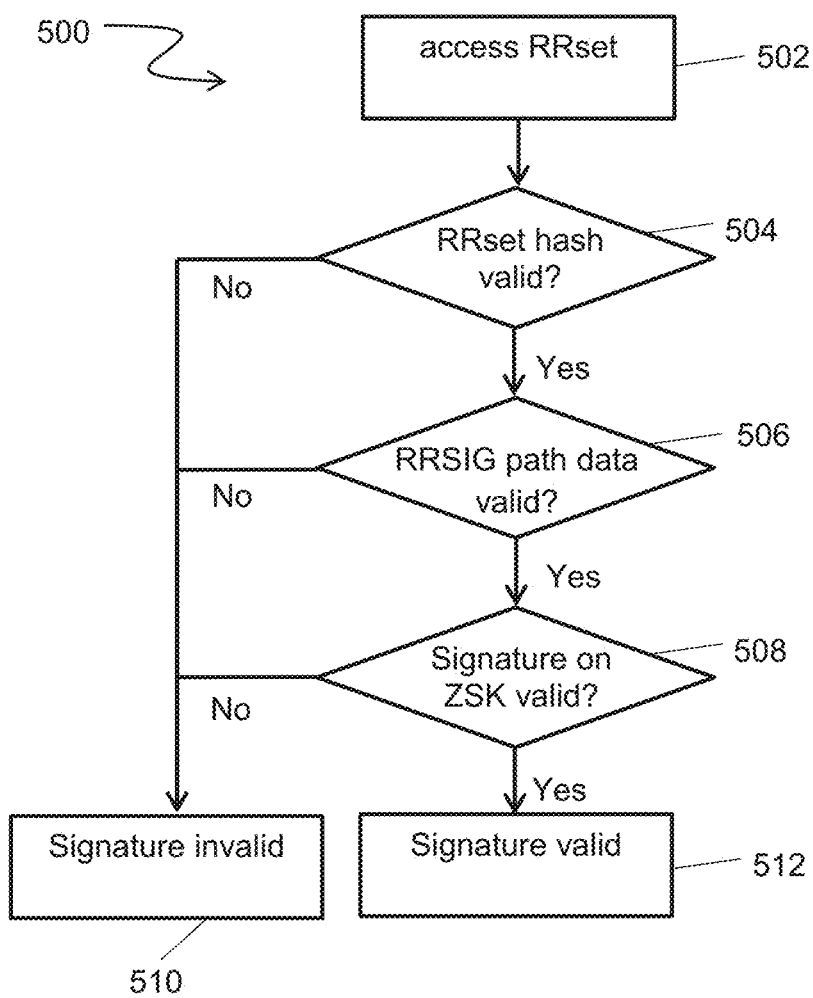
FIG. 5 is a flowchart illustrating a method of validating a signature on a DNS RRset according to some embodiments.

FIG. 5 is a flowchart illustrating a method 500 of validating a signature on a resource record according to some embodiments. The method may be implemented by a client computer, for example. The resource record in question may be included in an RRset signed according to the method shown and described in reference to FIG. 4, for example. Thus, the method may validate a signature on a DNS resource record that appears in an RRset that was used to generate a leaf node as part of the process of FIG. 4. Such validation may also consequentially simultaneously validate the other resource records that appear in the RRset, i.e., validate a group of related records. Note that, in general, method 500 may be implemented by a DNS client (e.g., client computer 102 of FIG. 1 or a browser executing thereon) to validate DNS resource record signatures as disclosed herein as part of a domain name resolution process such as that shown and described in reference to FIG. 1. Such a client computer (or browser) may therefore include validation logic that performs the blocks of FIG. 5.

At block 502, the method accesses an RRset that includes the resource record for which the signature is to be validated.

The method may form the RRset anew, or may access it in its totality. The method may access such an RRset by communicating with a DNS server, e.g., an authoritative DNS server, for a respective zone of the resource record, for example.

At block 504, which is optional in some embodiments, the method determines whether the RRset has a valid hash in the respective RRSIG resource record. That is, the method validates an RRset hash on the RRset that includes the resource record in question. As part of this block, the method may apply a hash function to the RRset accessed at block 502 (optionally including an index such as a leaf node location identifier and/or salt value). The method also accesses the associated RRSIG resource record corresponding to the RRset. The method extracts the hash of the respective RRset from the RRSIG record (e.g., as recorded per optional block 412 of FIG. 4), and compares it to the newly-formed hash of the RRset resource record. If the comparison is positive, i.e., if the data are identical, then the method proceeds to block 506. Otherwise, the method outputs a result indicating that the validation failed, and the method halts at block 510.

At block 506, the method determines whether the RRset has valid path data in the respective RRSIG resource record. As part of this block, the method extracts the respective path data from the RRSIG resource record (e.g., as recorded per block 410 of FIG. 4). The method proceeds to use the path data (as well as the hash of the RRset, which may have already been obtained at block 504) to re-construct a portion of the recursive hash tree up to and including the root. Thus, at the bottom level of the recursive hash tree, the method combines the hashed RRset data of the RRset that includes the resource record to be validated with the hashed RRset data of its sibling node, obtained from the path data. The method hashes the resulting combination, which, if correct, will equal the parent node of both nodes. At each subsequent level of the recursive hash tree, the actions of this block combine the hash so far accumulated with the data of the next respective sibling node as obtained from the path data in the RRSIG resource record (optionally together with an index and/or salt value), and hash the result. The process continues up the tree to the root node. Once the process reaches the root node and confirms that the accumulated hash value matches the hash value at the actual root node (i.e., the ZSK), the process proceeds to block 508; otherwise the process proceeds to block 510, indicates that the signature is invalid, and halts. (In some embodiments, the method may instead confirm the consistency of the accumulated hash value with the hash value at the actual root node by other means, e.g., if a hash of the actual root node is stored as the public key, then the method may confirm that the hash of the accumulated hash value matches the public key.) Thus, according to some embodiments, the only values from the hash tree that the verifier needs in order to verify the signature on the RRset are the path data (which is part of the signature) and the value of the root node, i.e., the ZSK (or, in some embodiments, other information sufficient to validate the root node). In such embodiments, the verifier re-constructs other portions of the hash tree but does not need to know their correct values.

As an example of the actions of block 506, and with respect to FIG. 3, in order to validate the path data for leaf node 5 (310), for example, the process of block 506 extracts the value of sibling leaf node 6 (312) from the path data in the respective RRSIG record, combines it with the value of leaf node 5 (310), and hashes the result. The process of block 506 then extracts the value of (now) sibling node 6 (316) from the path data in the respective RRSIG record, combines it with the value of node 5 (308), and hashes the combined value. The process of block 506 next extracts the value of (now) sibling node 1 (318) from the path data in the respective RRSIG record, combines it with the value of node 2 (314), hashes the result, and compares it with the value of the parent, which is the root node 306 at this stage in the process. If the comparison is valid, then the process continues to block 508; otherwise the process proceeds to block 510, indicates that the signature is invalid, and halts.

At block 508, the method determines whether a signature on the ZSK is valid. Example embodiments of this block are shown and described in reference to FIGS. 6 and 7, below. In particular, this block may include validating a one-time hash-based signature per the method shown and described in reference to FIG. 7 below. The one-time hash-based signature may be produced as shown and described in reference to FIG. 6, e.g., based in part on data stored in a key signing key (KSK) DNSKEY resource record. If the signature on the ZSK is validated per block 508, then the method proceeds to block 512, outputs an indication of signature validity, and halts; otherwise the process proceeds to block 510, indicates that the signature is invalid, and halts.

Note that in some embodiments, the actions of block 508 are optional. That is, a signature on an RRset may be validated without validating a signature on the ZSK that was used to sign the RRset, by performing blocks 502, 504, and 506, and omitting block 508, according to some embodiments. Block 508 may serve to complete validation of a chain of trust, however, so it may be included in some embodiments.

Figure 6:
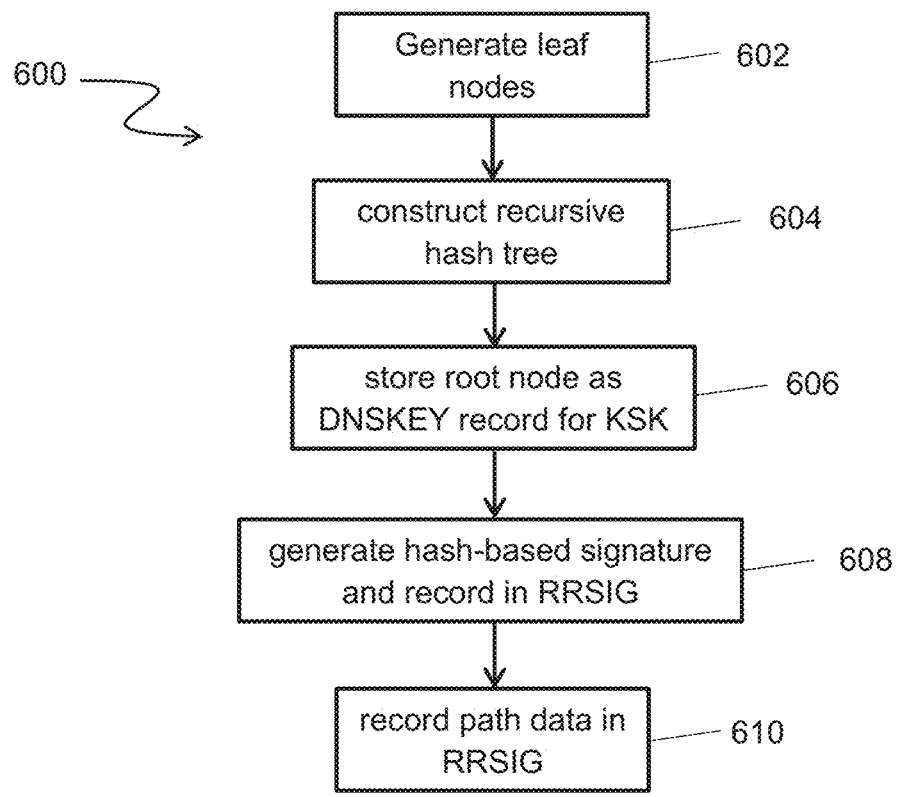
FIG. 6 is a flowchart illustrating a method of signing a zone signing key (ZSK) according to some embodiments.

FIG. 6 is a flowchart illustrating a method 600 of signing a zone signing key (ZSK) according to some embodiments. The ZSK may be a root node of a recursive hash tree, such as that stored at block 408 of FIG. 4. The ZSK may be included in an RRset, and the entire RRset signed as described. The method may be implemented by a DNS name server (e.g., DNS server 106 of FIG. 1 or an authoritative DNS server), or a specialized computer communicatively coupled to such a DNS name server, for example. Such a specialized computer may include one or more cryptographic co-processors, for example.

At block 602, the method generates leaf nodes toward generating a full recursive hash tree. Each leaf node may be generated as follows. Choose a sequence of k random number pairs $(X_{ij})_{1 \leq i \leq k, j \in \{0,1\}}$, where each $X_{ij}$ is, e.g., the same length as a length an output from a hash function H. The number k may also be selected to be the length of an output of a hash function. Next, generate a sequence $(Y_{i,j})_{1 \leq i \leq k, j \in \{0,1\}}$, where each $Y_{ij} = H(X_{ij})$. The index values (i,j) and/or a salt value may also be included with the input to the hash function in some embodiments. The sequence $(Y_i, j)_{1 \leq i \leq k, j \in \{0,1\}}$ is a one-time public key and is then used (or its hash is used) at block 604 as one of the leaves to build a recursive hash tree in the manner shown and described in reference to FIG. 3. Thus, the recursive hash tree is generated by iteratively combining and hashing pairs of nodes until the root of the tree is generated, where each leaf corresponds to a one-time public key (or its hash). The sequence $(X_{ij})_{1 \leq i \leq k, j \in \{0,1\}}$, associated with a leaf node, is the corresponding one-time private key.

At block 606, the method stores the root node of the recursive hash tree from block 604 in a DNSKEY resource record for a key signing key (KSK). That is, the method stores the recursive hash tree root where a public key of an asymmetric key pair would normally be stored in a KSK DNSKEY resource record. (In some embodiments, the method may store information sufficient to validate the root, e.g., a hash of the root, as a public key, rather than the root itself.) Details of how this data is used to validate a signature on a ZSK are presented in reference to FIG. 7, below.

At block 608, the method generates a hash-based signature on the ZSK using the recursive hash tree and records it in an RRSIG record for the RRset that includes the ZSK. The one-time signature may be generated as follows. First, select any leaf node of the recursive hash tree that has not previously been used to generate a signature, and let $(X_{ij})_{1 \leq i \leq k, j \in \{0,1\}}$ denote the associated one-time private key. Second, represent the hash of the RRset that includes the ZSK in binary format as the sequence $(b_i)_{1 \leq i \leq k}$. Third, build a signature string $(sig_i)_{1 \leq i \leq k}$ by checking, for each i, whether $b_i$ is 0 or 1. If 0, then define $sig_i$ equal to $X_{i0}$, otherwise define $sig_i$ equal to $X_{i1}$. Fourth, denote sig as the concatenation (or other combination) of the $sig_i$ for $1 \leq i \leq k$. Then sig= $(sig_1 \| sig_2 \| \ldots \| sig_k)$ is a one-time hash-based signature on the RRset that includes the ZSK, where the symbol "‖" represents the concatenation operator. Fifth, record sig in an RRSIG record for the RRset that includes the ZSK, e.g., the RRSIG resource record associated with the DNSKEY resource record. The next block will amend the contents of this record to complete the signature on the RRset that includes the ZSK.

At block 610, the method records (a) the one-time public key $(Y_{ij})_{1 \leq i \leq k, j \in \{0,1\}}$ and (b) path data in the RRSIG record for the ZSK. The one-time public key and the path data are concatenated (or otherwise combined) with the one-time hash-based signature sig recorded in the RRSIG record for the RRset that includes the ZSK per block 608. The path data is similar to the path data described in reference to block 410 of FIG. 4. Thus, the path data starts with the sibling node to the node that was used to generate the one-time hash-based signature sig per block 608 above, and includes sibling node data for each successive parent as described in reference to block 410 of FIG. 4. Thus, after block 610, the RRSIG record for the RRset that includes the ZSK includes the one-time hash-based signature sig on the ZSK, as well as the respective path data. As described in connection to FIG. 3, the path data may also (or alternately) include an identifier of the position of the leaf node in the tree. Note that in some embodiments, portions of the one-time public key may be omitted if they can be reconstructed from respective portions of the one-time hash-based signature.

Figure 7:
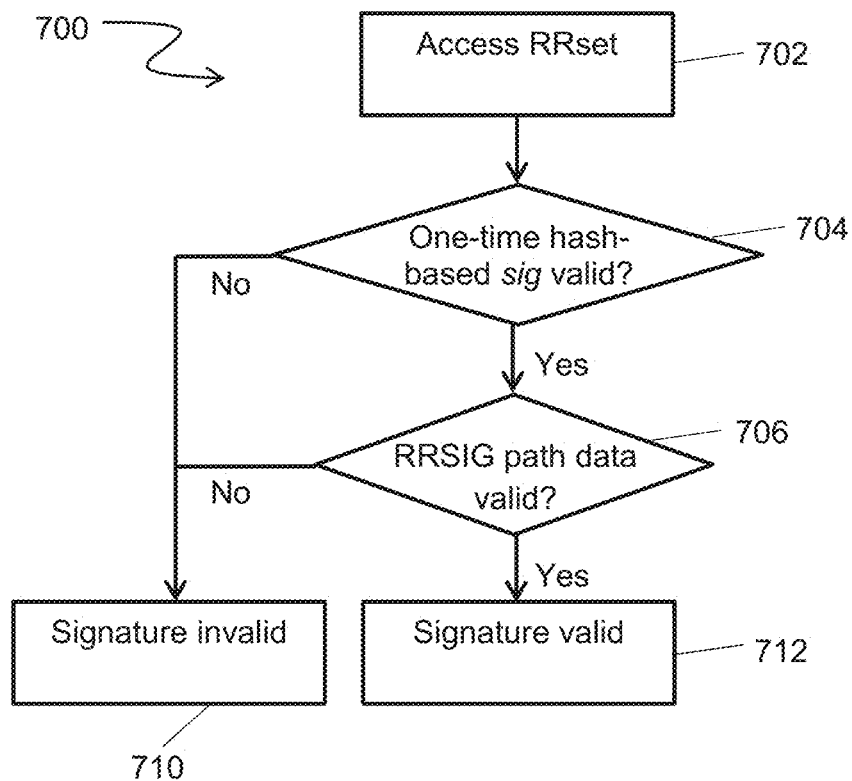
FIG. 7 is a flowchart illustrating a method of validating a signature on a zone signing key (ZSK) according to some embodiments.

The signature produced according to method 600 may be validated using method 700 of FIG. 7, presented below.

FIG. 7 is a flowchart illustrating a method 700 of validating a signature on a zone signing key (ZSK) DNSKEY resource record according to some embodiments. The signature itself may be in a DNSKEY RRSIG record, e.g., as produced according to method 600 of FIG. 6. That is, the ZSK DNSKEY resource record may be included in an RRset signed according to the method 600 of FIG. 6. Such validation may also validate the other resource records that appear in the RRset corresponding to the RRSIG. Note that, in general, method 600 may be implemented by a DNS client (e.g., client computer 102 of FIG. 1, or a browser executing thereon) to validate DNS resource record signatures as disclosed herein as part of a domain name resolution process such as that shown and described in reference to FIG. 1. Such a client computer (or browser) may therefore include validation logic that performs the blocks of FIG. 7.

At block 702, the method accesses a DNSKEY RRset that includes the ZSK resource record for which the signature is to be validated. The method may form the RRset anew, or may access it in its totality. The method may access such an RRset by communicating with a DNS server, e.g., an authoritative DNS server, for a respective zone of the resource record, for example. The method may represent the hash of the RRset as a binary sequence $(b_i)_{1 \leq i \leq k}$.

At block 704, the method validates the one-time hash-based signature on the ZSK. To do this, the method accesses the RRSIG record corresponding to the RRset that includes the ZSK, i.e., the RRset accessed per block 702. The method then parses the record to extract $sig=(sig_1 \| sig_2 \| \ldots \| sig_k)$, which may have been produced according to block 608 of FIG. 6, the one-time public key, and the path data as produced according to block 610 of FIG. 6. Next, for each $1 \leq i \leq k$ the method checks the hash value $H(sig_i)$. That is, for each $1 \leq i \leq k$, the method checks whether the following holds: if $b_i=0$, then $H(sig_i)=Y_{i0}$, otherwise $H(sig_i)=Y_{i1}$. If this holds for all i, then the method proceeds to block 706. Otherwise, the method proceeds to block 710, indicates that the signature is invalid, and halts. Note that in embodiments, portions of the one-time public key may be reconstructed from respective portions of the one-time hash-based signature rather than checking them at this block, where the effect of checking is accomplished indirectly through the validation of the path data in conjunction with the reconstructed portions.

At block 706, the method validates the path data stored in the RRSIG record for the ZSK DNSKEY RRset, i.e., the RRset accessed per block 702. The method then parses the record to extract the path data. The actions of this block are similar to those of block 506 of FIG. 5.

Namely, the actions of block 706 use the path data and the hash of the one-time public key to re-construct a portion of the recursive hash tree up to and including the root. Thus, at the bottom level of the recursive hash tree, the method combines the hash of the one-time public key extracted from the signature with the hashed one-time public key of its sibling node, obtained from the path data. The method hashes the resulting combination, which, if correct, will equal the parent node of both nodes. At each subsequent level of the recursive hash tree, the actions of this block combine the hash so far accumulated with the data of the next respective sibling node as obtained from the path data in the RRSIG resource record, and hash the result. The process proceeds up the tree until the root node is reached.

Once the process re-derives the hash value of the root node and confirms that it matches the hash value of the actual root node as stored in the DNSKEY record for the KSK, the process proceeds to block 712, outputs an indication of signature validity, and halts. Otherwise the process proceeds to block 710, indicates that the signature is invalid, and halts. (In some embodiments, similar to block 506, the method may instead confirm the consistency of the re-derived hash value with the hash value of the actual root node by other means, e.g., if a hash of the actual root node is stored as the public key, then the method may confirm that the hash of the re-derived hash value matches the public key.)

Other hash-based one-time signature schemes may be combined with a recursive hash tree in some embodiments, and other hash-based signature schemes may also be employed in connection with the KSK and/or for signing the ZSK in variants. In particular, modes such as the Leighton-Micali Signature (LMS) system, the eXtended Merkle Signature Scheme (XMSS) and SPHINCS are acceptable in terms of their security assurances and efficiency, and would be appropriate alternatives to the scheme described herein. Both stateful and stateless modes may be employed, as well as modes based on "few-time" signature schemes.

Figure 8:
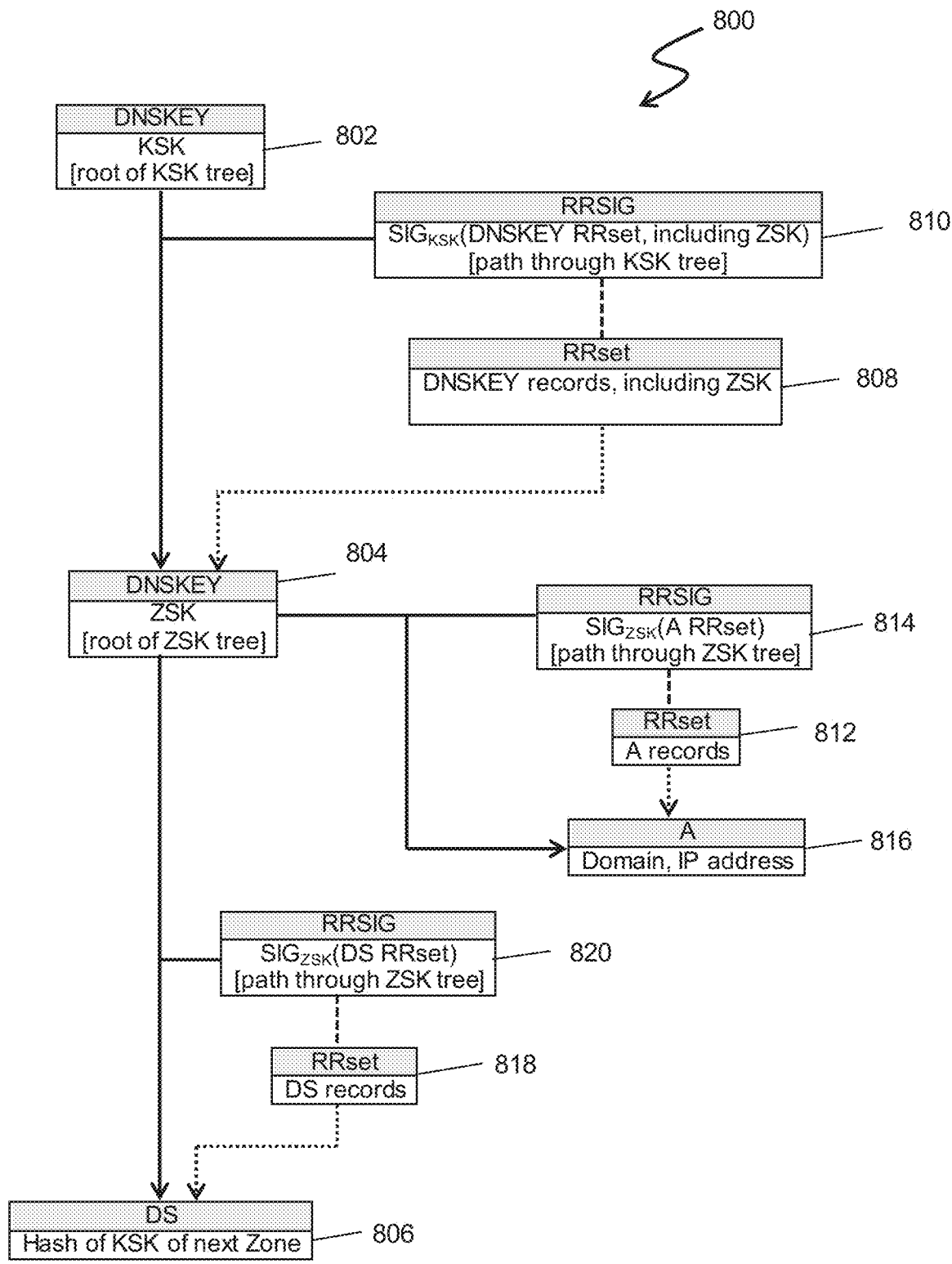
FIG. 8 is a schematic diagram depicting DNSSEC resource records for a zone according to some embodiments.

FIG. 8 is a schematic diagram depicting DNSSEC resource records 800 for a DNS zone according to some embodiments. The resource records depicted in FIG. 8 may be stored in, for example, a DNS zone file, an authoritative DNS name server, or a recursive DNS name server. The dashed lines in FIG. 8 depict associations between resource record sets (RRsets) and their respective resource record signatures (RRSIGs). The dotted lines in FIG. 8 represent inclusion of resource records in their respective RRset.

The resource record signatures, KSK, and ZSK depicted in FIG. 8 may be produced according to the techniques disclosed herein. For example, method 400 of FIG. 4 may be used to produce a signature on an A-type resource record set (RRset) 812 containing A-type resource record 816. The signature, which includes path data for the recursive hash tree whose root is stored in ZSK DNSKEY resource record 804, may be stored in RRSIG resource record 814 associated with A-type RRset 814. As another example, method 400 of FIG. 4 may be used to produce a signature on delegation signer (DS) resource record 806. More particularly, the signature may be on RRset 818, which includes DS resource record 806. The signature may be stored in RRSIG resource record 820 associated with RRset 818 and include path data from the recursive hash tree whose root forms the ZSK. DNSKEY resource record 804 for the ZSK may be formed while signing RRset 818 and/or RRset 812 using method 400; that is, as in the preceding example, the root of the recursive hash tree generated by method 400 may be stored as a ZSK in DNSKEY resource record 804.

Further, method 600 of FIG. 6 may be used to sign DNSKEY resource record 804 for the ZSK. More particularly, the ZSK may be included in DNSKEY RRset 808, which may be signed using method 600 to generate RRSIG resource record 810. RRSIG resource record 810 includes a signature as produced by method 600, including path data and a one-time hash-based signature on the ZSK. Further, method 600 as applied generates a recursive hash tree, whose root is stored as a KSK in DNSKEY resource record 802.

Note that the solid arrows of FIG. 8, which include two originations and a single arrowhead, represent signature validation. More particularly, as described in detail herein (e.g., with respect to FIGS. 6 and 8) the resource record at the head of a solid arrow may be validated using data from the two resource records at the originations of the arrow. Descriptive examples of such validation in the context of FIG. 8 follow.

Method 500 of FIG. 5 may be used to validate the signature of RRSIG resource record 814 on RRset 812, which includes A-type resource record 816. The validation of method 500 may utilize both the root of the respective recursive hash tree as stored in ZSK DNSKEY resource record 804 and the path data in RRSIG resource record 814 to validate the signature of RRSIG resource record 814 on A-type resource record 816, thereby validating A-type resource record 816. As another example, method 500 may be used to validate the signature of RRSIG resource record 820 on RRset 818, which includes DS resource record 806. Per method 500, the root of the generated recursive hash tree as stored as a ZSK in DNSKEY resource record 804, and the respective path data as stored in RRSIG resource record 820, is used to validate the signature of RRSIG resource record 820. This accordingly validates RRset 818 and its contents, including DS resource record 806.

As yet another example of how the disclosed techniques may be used to generate the resource records and the relationships depicted in FIG. 8, method 700 of FIG. 7 may be used to validate ZSK DNSKEY resource record 804 by way of validating the signature of RRSIG resource record 810. That is, RRset 808 includes ZSK DNSKEY resource record 804 and is signed as represented in RRSIG resource record 810. Path data from the recursive hash tree whose root is stored as the KSK in DNSKEY resource record 802 as well as the KSK itself is used, per method 700, to validate the signature of RRSIG resource record 810, thereby validating RRset resource record 808 and its included copy of ZSK DNSKEY resource record 804.

Note that a portion of a DNSSEC trust chain appears on the left-hand side of FIG. 8. In particular, KSK DNSKEY resource record 802 may be used (together with other data) to validate ZSK DNSKEY resource record 804, which may be used (together with other data) to validate delegation signer (DS) resource record 806. However, according to some embodiments, the validations are not based on traditional asymmetric cryptography. Instead, the validations utilize recursive hash trees as described herein.

Thus, disclosed embodiments provide long-term protection to DNSSEC in the form of a new hash-based signature algorithm family that will help maintain DNSSEC as a trust mechanism for multiple-purpose information associated with domain names. In contrast, non-optimized known approaches to hash-based signatures involve significant memory usage overhead and may be intractably large if attempted to be used in the context of DNS.

The combination of the method of generating a ZSK, signing RRsets, and validating signatures on resource records described in FIGS. 4 and 5, with the method of signing a ZSK and validating a signature on a ZSK described in FIGS. 6 and 7, can protect against future cryptanalysis by a quantum computer, inasmuch as the security of both signature algorithms depends only on the assumption that a hash function is secure (e.g., preimage resistant, etc.). However, for transitional purposes while hash-based signature algorithms are still being introduced and conventional algorithms are still deployed, it is also possible to combine the method described in FIGS. 4 and 5 with a conventional signature algorithm for signing the ZSK. Indeed, such a combination may coexist with the fully hash-based approach, given that DNSKEY RRsets may be signed with more than one key. For example, a zone may have both a conventional ZSK and a hash-based ZSK per the methods described herein, and a conventional KSK and a hash-based KSK. The DNSKEY RRset for the zone would include ZSKs and KSKs of both types, with signatures of both types. Other RRsets may be signed with either or both types of algorithm (and, following DNSSEC practice, under the control of one or more different ZSKs). This would support both compatibility with client computers implementing the conventional algorithms as well as the introduction of hash-based algorithms.

For technical reasons, DNSSEC specifications currently state that a signature on an object made with a particular signature algorithm under a ZSK is only valid if the ZSK is also signed with the same signature algorithm (indicated by an algorithm identifier). Although the signature algorithms described herein are both hash-based, they are technically not the same, and thus would normally utilize separate algorithm identifiers when added to DNSSEC. Thus, the combination of algorithms would not pass validation under the current DNSSEC specifications, if their algorithm identifiers were separate. However, it is straightforward to remedy the situation by extending the signature format for each algorithm to include a flag that indicates whether the signature is of the ZSK type or KSK type, or alternatively to infer the type from the type of the key (i.e., its position in the level of nodes in the trust chain). Accordingly, a single algorithm identifier could be employed for both, and the signatures would be accepted as valid by client computers following the conventional DNSSEC architecture (assuming they are upgraded to process the new signature algorithms).

The size advantage of the method described herein is at least partially a result of the batching. Rather than each RRset having a relatively long hash-based signature, the signature would be relatively short, i.e., only the path data. The ZSK would also be short, but its signature would be relatively long. The size overhead of signatures would thus be amortized across the batch. The longer the batch, the less the share of the overhead from the long signature on the ZSK per RRset. A batch could cover the entire zone, which may be convenient if the zone is updated and re-signed only occasionally. Batches could also be organized according to the expected frequency of changes of RRsets. Infrequently changing RRsets could go into one large batch, and frequently changing RRsets into multiple, small batches. The share of the size overhead per RRset would be greater for the small batches, but the time delay from an update to the RRset to the update of the signature would be smaller, because the batch would fill up sooner. An updated RRset could also be put into its own batch if the update needs to be propagated immediately.

Note that whenever a new batch is created and signed, a new ZSK is generated, and added to the DNSKEY RRset for the zone. When the DNSKEY RRset is updated, its associated RRSIG record is also updated. Verifiers will then need to obtain both the new RRset (which would include the new ZSK) and the new RRSIG record. As the number of active ZSKs for the zone grows, the DNSKEY RRset will also grow, imposing a potential overhead on verifiers. Thus, the number of active ZSKs may be selected to be optimal or efficient. For instance, RRsets that were initially organized into small batches could be combined into larger batches, thus reducing the number of active ZSKs over time. Various approaches may be taken to achieve this optimization, including, for example, periodic re-batching and re-signing of RRsets that have already been signed; and parallel batching and signing of RRsets into small batches (for reduced latency) and large batches (for reduced overhead) that would later replace the small batches.

Although some embodiments have been described in terms of DNSSEC, other embodiments may be applied to other protocols where records, their digital signatures, and associated public keys are obtained from online services, and where it is desirable to have an efficient implementation of hash-based signatures.

Some embodiments may be implemented as a feature in various DNS components, e.g., based on BIND, UNBOUND, getdns, etc. The signature validation may be implemented in a client computer stub resolver and/or at a recursive name server. The signature generation may be implemented in an authoritative name server, and/or in a provisioning system that produces the records published by the authoritative name server.

III. Hierarchical Digital Signatures for Signing Internet Data Records

The quantum-computer resistant hierarchical digital signature scheme and associated public key infrastructure ("PKI") shown and described above in reference to FIGS. 3-8 may be used for a variety of different internet data records in a variety of internet-based situations. That is, the disclosed scheme is not limited to usage in DNSSEC. This section details various internet-based contexts in which the present quantum-computer resistant digital signature hierarchical PKI scheme may be deployed. The scheme may be combined with other cryptographic schemes in these contexts, including other quantum-computer resistant schemes, non-quantum-computer resistant schemes, schemes involving asymmetric cryptography, and schemes involving symmetric cryptography. For example, the present scheme may be deployed to provide authentication and non-repudiation of internet data records, and a symmetric cryptography scheme may be deployed to provide confidentiality.

The various internet-based PKI schemes that may be improved by the disclosed quantum-computer-resistant hash-based digital signatures for internet PKI share several commonalities. Such commonalities include usage for internet data records, a hierarchy of keys for generating trust chains (e.g., as depicted in FIGS. 2 and 8) and high-volume signature requirements. Here, an "internet data record" is computer-readable data that is used for internet infrastructure or applications, e.g., navigation, routing, server authentication, client authentication, user authentication, authorization, or payments. Before embarking on a detailed description of how the existing schemes may be improved, a general overview of the schemes and some of the alteration details is presented in reference to FIG. 9.

FIG. 9 is a table 900 summarizing various implementation contexts and details for providing quantum-computer-resistant hierarchical digital signatures in an internet PKI environment. In particular, table 900 includes a first column identifying a variety of internet PKI implementations 902, including DNSSEC 910, which is shown and described above in Section II. Additional internet PKI implementations 902 for quantum-computer resistant PKI depicted in the first column of table 900 include: certification authority (CA) 918, certificate status responder 926, certification authority combined with a delegated certificate status responder 934, identity provider 942, code signer 950, and payment authority 958. Table 900 also includes additional columns explaining how the special public keys produced by the disclosed technique, including hash-based public keys 904 and synthesized public keys 906, fit within the disclosed contexts. Table 900 also depicts the internet data records 908 that may be signed according to the disclosed techniques.

The different implementations represented in Table 900 are intended to be illustrative and are not necessarily exclusive. For example, internet data records 908 of different types may be combined to produce a common synthesized public key 906, e.g., a common intermediate-level public key 922 and status responder public key 930 may be synthesized from a batch comprising both certificate content records 924 and certificate status data records 932. In addition, the same hash-based public key 904 may validate different types of synthesized public key 906, e.g., a higher-level CA public key 920, may validate both an intermediate-level CA public key 922 and an identity provider public key 946. Furthermore, an internet data record 908 itself may comprise one or more synthesized public keys and/or one or more hash-based public keys, thereby extending the hierarchy an additional level. Additional PKI schemes such as Certificate Revocation Lists and Certificate Revocation Trees may also be supported by similar constructions. The contexts are further explained below, and the remainder of table 900 is explained in detail in reference to FIGS. 10-13.

Of note in table 900 is the certification authority combined with a delegated certificate status responder 934. As depicted in table 900, certification authority combined with a delegated certificate status responder 934 has both a higher-level certification authority public key 920 and an intermediate-level certification authority public key 922, the former used to validate the latter. The certification authority combined with a delegated certificate status responder 934 uses the private key corresponding to the intermediate-level certification authority public key 922 to sign certificate content 924 to create certificates. So far, this description of the combined certification authority and certificate status responder 934 is consistent with a certification authority 918 without a delegated certificate status responder. However, the certification authority combined with a delegated certificate status responder 934 also uses the private key corresponding to the intermediate-level certification authority public key 922 to sign a status responder public key 930 (and associated content to be included with the status responder public key 930 in a certificate), thereby delegating authority to the status responder public key 930. The private key corresponding to the status responder public key 930 is used to sign certificate status data 932 to create certificate status responses. This additional level is depicted in table 900 by arrow 966 (rather than by adding an additional column).

Figure 10:
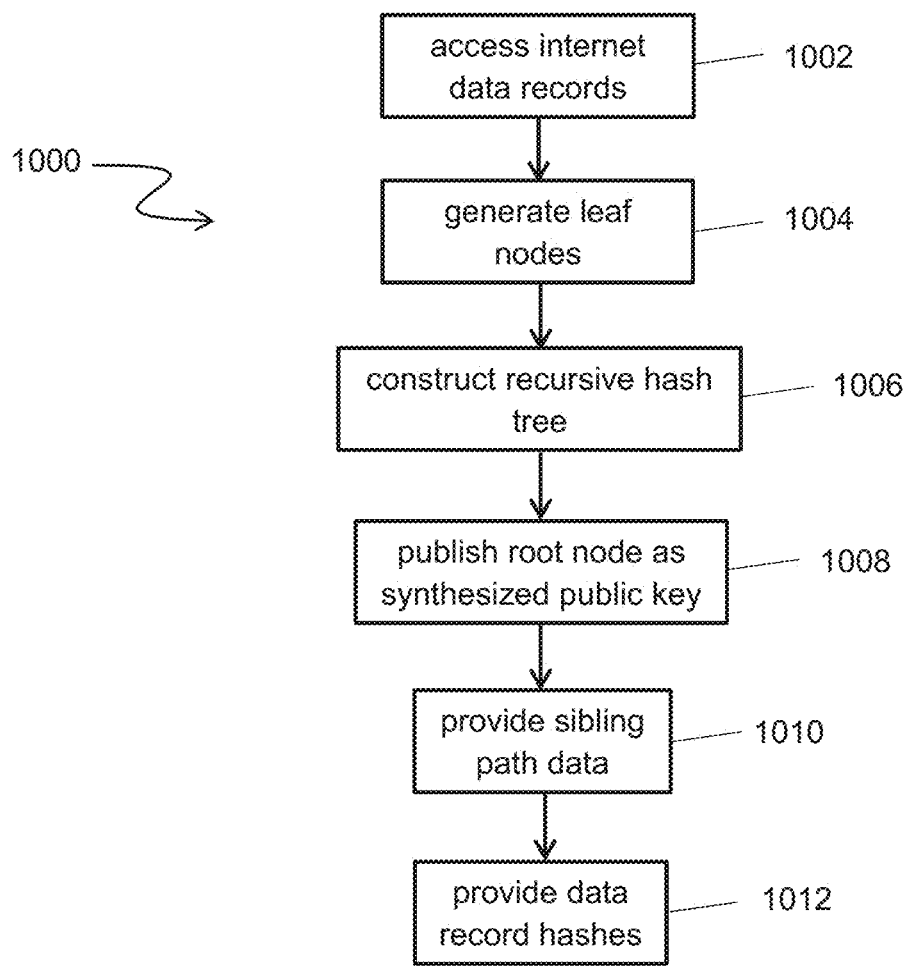
FIG. 10 is a flowchart illustrating a method for producing digital signatures on internet data records.

FIG. 10 is a flowchart of a method 1000 for producing digital signatures on internet data records. The method may be implemented by an electronic hardware server computer, for example, to produce the disclosed signatures for internet data records. Such a server computer may include one or more cryptographic co-processors, for example.

Method 1000 is similar to method 400 of FIG. 4. A difference is that method 1000 is not limited to the context of DNSSEC. Rather, method 1000 may be implemented to provide quantum-computer resistant hierarchical PKI signatures for any of the contexts presented in the first column of table 900.

At block 1002, method 1000 accesses internet data records. Which type of data records are accessed depends on the particular context. For DNSSEC 910, a batch of DNS resource record sets (or RRsets) 916 is accessed. For a certification authority 918, a batch of certificate content records 924 that the certification authority is requested to sign is accessed. For a certificate status responder 926, a batch of certificate status data records is accessed. For a certification authority combined with a delegated certificate status responder 934, a batch comprising both certificate status data records 924 and one or more status responder public keys 930 is accessed. For an identity provider 942, a batch of authentication assertion content records 948 is accessed. For a code signer 950, a batch of software images 956 that have been requested to be signed is accessed. For a payment authority 958, a batch of payment transaction records 964 is accessed. In some embodiments, method 1000 may alternatively access hash values of internet data records that are to be signed at block 1002.

According to some embodiments, the number of records accessed according to block 1002 and processed according to subsequent blocks may be an integer power of two, or the method may pad the records with dummy or blank records such that the total number including the dummy or blank records is an integer power of two, if required by the tree structure. Thus, the signing operation of method 1000 may be applied to a batch of objects to be signed of arbitrary size. Although recursive hash trees typically have a number of leaves that is a power of two, this is not meant as a limitation. Whereas in a binary tree, each non-leaf node has two child nodes, in some embodiments, a non-leaf node may have more or fewer than two child nodes. Furthermore, whereas in a binary tree, the child nodes of a given non-leaf node either consist only of leaf nodes, or only of non-leaf nodes, in some embodiments, the child nodes of a given non-leaf node may comprise both leaf nodes and non-leaf nodes. This possibility also accommodates "chain" constructions where successive intermediate non-leaf nodes are the accumulated hashes of a sequence of leaf nodes, which may be convenient in some embodiments.

At block 1004, method 1000 generates leaf nodes from the records accessed at block 1002. This may be accomplished by grouping (e.g., concatenating) the accessed records into appropriate-sized chunks, and then applying a hash function to the groups, such that a leaf node is associated with a group of related records, such as an RRset. Suitable hash functions include cryptographic hash functions, such as by way of non-limiting example, SHA-256. The leaf nodes may be temporarily stored in volatile memory as part of this block, or they may be transferred to persistent memory. A leaf node location identifier and/or a salt value may also be input to the hash function according to some embodiments.

Batching may be applied at block 1004 to form the leaf nodes from the internet data records 908. Suitable batching techniques are disclosed in Section IV, below.

At block 1006, method 1000 constructs a recursive hash tree from the leaf nodes produced at block 1004. That is, method 1000 builds a recursive hash tree, e.g., as shown and described in reference to FIG. 3, from the leaf nodes of block 1004. Thus, pairs of nodes are concatenated (or otherwise combined) and hashed (optionally together with index and/or salt inputs) in order to obtain parent nodes from child nodes as shown and described in reference to FIG. 3 until the root node is constructed. The recursive hash tree may be temporarily stored in volatile memory before storing all, or parts thereof, in persistent memory.

At block 1008, method 1000 publishes online the root node as a synthesized public key in a PKI scheme as shown and described herein. The particulars of the publication depend on the context. For DNSSEC 910, the root node is published online as a synthesized ZSK DNSKEY resource record 914. For a certification authority 918 or a certification authority combined with a delegated certificate status responder 934, the root node is published online as a synthesized intermediate-level certification authority public key 922. For a certificate status responder 926, the root node is published online as a synthesized status responder public key 930. For an identity provider 942, the root node is published online as an synthesized identity provider public key 946. For a code signer 950, the root node is published online as a synthesized code signing public key 954. For a payment authority 958, the root node is published online as a synthesized payment authority public key 962. In some embodiments, the root node may be published as an entry in a public ledger, e.g., a block chain, or as a "trust anchor" configured in a storage device or electronic processor. Details of how the root node is used as a public key to validate signatures is disclosed herein, e.g., in reference to FIG. 11.

At block 1010, method 1000 provides sibling path data for the leaf nodes to be signed. The particular way that the sibling path data is provided depends on the particular context. For DNSSEC 910, the sibling path data is provided by publishing it in a resource record signature (RRSIG) record. For a certification authority 918, or for a certification authority combined with a delegated certificate status responder 934, the sibling path data is provided in a certificate, which may be provided to a user via email, Transport Layer Security ("TLS"), or a different authentication or key establishment protocol. For a certificate status responder 926, the sibling path data may be provided in a certificate status response to a requesting client. For a code signer 950 or a payment authority 958, the sibling path data may be provided to the requesting code developer via a software update protocol, a payment protocol, or any other electronic communication protocol. This sibling path data serves as a signature on the leaf node data as described in detail in reference to FIG. 11.

At block 1012, method 1000 provides leaf node hashes. This data may be concatenated with the path data of block 1010, and provided in a combined data package. This step is optional, because the hash can be recomputed and confirmed in combination with the path, but may be useful in embodiments as a more immediate confirmation of the hash.

Blocks 1010 and optional 1012 of FIG. 1000 may be repeated for each leaf node. Consequently, each leaf node has associated path data (and possibly a hash value) and provided in a combined data package, which serves as a signature as shown and described in reference to FIG. 11, below.

It is noteworthy that the synthesized public key of FIG. 1000 is derived from the objects it signs, whereas in conventional signature algorithms, a public key is generated first and then applied to the objects it signs afterwards. Note further that implementing a synthesized public key as shown and described does not require changing the protocols of the systems in which it improves standard PKI techniques, rather, only the underlying signature algorithm is changed. Because the synthesized public key is derived from the internet data records that are signed, if the internet data records include a reference to the public key, then the reference may be made by name or other identifier rather than by value (e.g., by hash of the public key).

Figure 11:
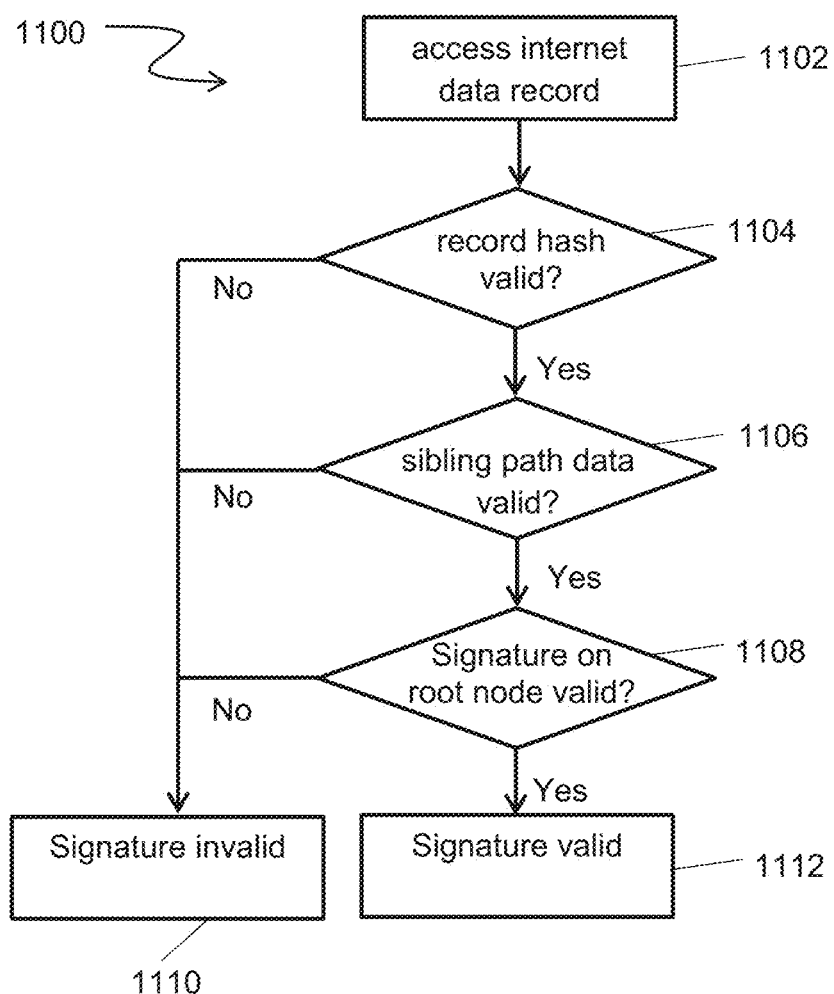
FIG. 11 is a flowchart illustrating a method of validating a signature on an internet data record according to some embodiments.

FIG. 11 is a flowchart illustrating a method 1100 of validating a signature on an internet data record according to some embodiments. Method 1100 may be implemented by a client computer, for example. Such validation may also consequentially simultaneously validate any other internet data records that are associated with the same leaf node, i.e., validate a group of related records such as an RRset. Note that, in general, method 1100 may be implemented by a client computer to validate signatures on the internet data records as disclosed herein. Such a client computer (or browser) may therefore include validation logic that performs the blocks of FIG. 1100.

At block 1102, method 1100 accesses a leaf node that corresponds to (e.g., includes, or includes a hash of) the internet data record for which the signature is to be validated. In some implementations, the leaf node may correspond to a single record, which signature is validated by method 1100. The particular internet data record for which a signature is validated by method 1100 depends on the particular implementation context. For DNSSEC 910, the internet data record in question may be a DNS resource record included in an RRset 916 as shown and described above in reference to FIG. 4. For a certification authority 918, the internet data record may be a certificate content record 924. For a certificate status responder 926, the internet data record may be a certificate status data record 932. For a certification authority combined with a delegated certificate status responder 934, the internet data record may be a certificate content record 924 and/or a status responder public key 930 (and associated content that to be included in a certificate). For an identity provider 942, the internet data record may be an authentication assertion content record 948. For a code signer 950, the internet data record may be a software image 956 that has been requested to be signed. For a payment authority 958, the internet data record may be a payment transaction data record 964. In some embodiments, method 1100 may alternatively access hash values of internet data records at block 1102.

At block 1104, which is optional in some embodiments, method 1100 determines whether the internet data record has a valid hash. As part of this block, the method may apply a hash function to the internet data record accessed at block 1102 (optionally including an index and/or salt value). The method also accesses the associated hash value(s) provided at block 1012 of FIG. 10. The method compares the provided hash to a newly-formed hash of the internet data record (or, in some embodiments, a group of related records comprising the internet data record). If the comparison is positive, i.e., if the data are identical, then the method proceeds to block 1106. Otherwise, the method outputs a result indicating that the validation failed, and the method halts at block 1110.

At block 1106, method 1100 determines whether the sibling path data for the internet records in question is valid. The actions of this block are analogous to the actions of block 506 of FIG. 5. Thus, method 1100 uses the sibling path data provided at block 1010 (as well as the hash provided at block 1012) to re-construct a and confirm the authenticity of a portion of the recursive hash tree up to and including the root. Once the process reaches the root node and confirms that the accumulated hash value matches the hash value at the actual root node, the process proceeds to block 1112 in which the signature is indicated as valid; otherwise the process proceeds to block 1110, indicates that the signature is invalid, and halts. Thus, according to some embodiments, the only values from the hash tree that the verifier needs in order to verify the signature on the internet record are the path data (which is part of the signature) and the value of the root node. In such embodiments, the verifier re-constructs other portions of the hash tree but does not need to know their correct values.

At block 1108, the method determines whether a signature on the synthesized public key 906 (i.e., root node) is valid. Example embodiments of this block are shown and described in reference to FIGS. 12 and 13, below. In particular, this block may include validating a one-time hash-based signature produced per the method shown and described in reference to FIG. 13 below. The one-time hash-based signature may be produced as shown and described in reference to FIG. 12, e.g., based in part on data stored in a hash-based public key. If the signature on the synthesized public key 906 is validated per block 11108, then method 1100 proceeds to block 1112, outputs an indication of signature validity, and halts; otherwise the process proceeds to block 1110, indicates that the signature is invalid, and halts.

Note that in some embodiments, the actions of block 1108 are optional. That is, a signature on an internet record 908 may be validated without validating a signature on the synthesized public key 906 that was used to sign the internet record 908, by performing blocks 1102, 1104, and 1106, and omitting block 1108, according to some embodiments. Block 1108 may serve to complete validation of a chain of trust, however, so it may be included in some embodiments.

Figure 12:
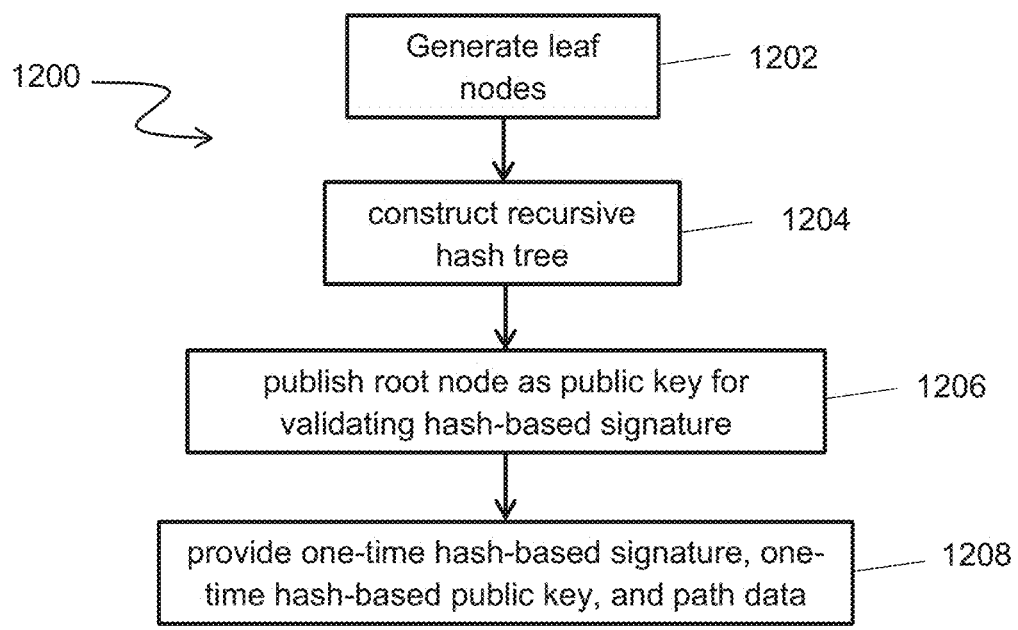
FIG. 12 is a flowchart illustrating a method of signing a synthesized public key with a one-time hash-based signature according to some embodiments.

FIG. 12 is a flowchart illustrating a method 1200 of signing a synthesized public key 906 with a one-time hash-based signature according to some embodiments. The synthesized public key 906 may be a root node of a recursive hash tree, such as that stored at block 1008 of FIG. 10. The particular synthesized public key 906 depends on the context. For DNSSEC 910, the synthesized public key 906 is a ZSK 914, as shown and described above in reference to FIG. 4. For a certification authority 918, or for a certification authority combined with a delegated certificate status responder 934, the synthesized public key 906 is an intermediate certification authority public key 922. For a certificate status responder 926, the synthesized public key is a status responder public key 930. For a code signer 950, the synthesized public key 906 is a code signing public key 954. For a payment authority 958, the synthesized public key 906 is a payment authority public key 962. Regardless of the context, the synthesized public key 906 may be included in a group of related records such as an RRset that is signed as described. Additional content may also be signed together with the synthesized public key 906, e.g., certificate content, according to known PKI specifications. Method 1200 may be implemented by a specialized server computer, for example. Such a specialized server computer may include one or more cryptographic co-processors, for example.

At block 1202, method 1200 generates leaf nodes toward generating a full recursive hash tree at block 1204. The actions of these blocks are essentially the same as those of blocks 604 and 606 of FIG. 6, because the actions of these block are independent of context.

At block 1206, method 1200 publishes online the root node of the recursive hash tree from block 1204 as a public key for validating the one-time hash-based signature on a synthesized public key 906. (The one-time hash-based signature itself is produced according to blocks 1208 and 1210. Note however that these steps may occur in any order that is technically possible.) Details of how this data is used to validate the hash-based signature on the synthesized public key 906 are presented in reference to FIG. 13, below. How the root node is published depends on context. For DNSSEC 910, the root node is published as a KSK DNSKEY resource record 912, as shown and described above in Section II. For a certification authority 918, or a certification authority combined with a delegated certificate status responder 934, the root node is published as a higher-level certification authority public key 920. For a certificate status responder 926, the root node is published as a certification authority public key 928 (where the certification authority may be the same certification authority that signed the certificate whose status is being provided, or a higher-level certification authority). For an identity provider 942, the root node is published as an identity provider key validating key 944. For a code signer 950, the root node is published as a code signer key validating key 952. For a payment authority 958, the root node is published as a payment authority key validating key 960. In some embodiments, the root node may be published as an entry in a public ledger, e.g., a block chain, or as a "trust anchor" configured in a storage device or electronic processor. In some embodiments, a key validating key 944, 952 or 960 may also be a certification authority public key.

At block 1208, method 1200 produces a one-time hash-based signature on the synthesized public key 906 using the recursive hash tree. The one-time hash-based signature may be generated as follows. First, select any leaf node of the recursive hash tree that has not previously been used to generate a signature, and let $(X_{ij})_{1 \leq i \leq k, j \in \{0,1\}}$ denote the associated one-time private key. Second, represent the synthesized public key 906 in binary format as the sequence $(b_i)_{1 \leq i \leq k}$. Third, build a signature string $(sig_i)_{1 \leq i \leq k}$ by checking, for each i, whether $b_i$ is 0 or 1. If 0, then define $sig_i$ equal to $X_{i0}$, otherwise define $sig_i$ equal to $X_{i1}$. Fourth, denote sig as the concatenation (or other combination) of the $sig_i$ for $1 \leq i \leq k$. Then $sig = (sig_1 \| sig_2 \| \ldots \| sig_k)$ is a one-time hash-based signature on the synthesized public key 906, where the symbol "||" represents the concatenation operator. Fifth, concatenate (or otherwise reversibly combine) sig, the one-time public key $(Y_{ij})_{1 \leq i \leq k, j \in \{0,1\}}$, and sibling path data (or a representation thereof) for the leaf node in the recursive hash tree. Denote the concatenation (or combination) as SIG. The sibling path data is similar to the path data described in reference to block 1010 of FIG. 10. Thus, the path data starts with the sibling node to the node that was used to generate the one-time hash-based signature sig per block 1208 above, and includes sibling node data for each successive parent as described in reference to block 10110 of FIG. 10. As described in connection to FIG. 3, the sibling path data may also (or alternately) include an identifier of the position of the leaf node in the tree. Note that in some embodiments, portions of the one-time public key may be omitted if they can be reconstructed from respective portions of the one-time hash-based signature.

Sixth, as part of block 1208, provide SIG, which includes the one-time hash-based signature sig, to an entity over the internet. The entity and manner of providing depends on the specific context. For DNSSEC 910, SIG is provided to DNS users by being recorded in the RRSIG record for the RRset that includes the ZSK 914. For a certification authority 918 or a certification authority combined with a delegated certificate status responder 934, SIG is provided to internet users by being included in a certificate for an intermediate-level certification authority public key 922. For a certificate status responder 926, SIG is provided to internet users by being included in a certificate for a status responder public key 930. For an identity provider 942, SIG is provided to internet users by being included in a certificate for an identity provider public key 946. For a code signer 950, SIG is provided to internet users by being included in a certificate for a code signing public key 954. For a payment authority 958, SIG is provided to internet users by being included in a certificate for a payment authority public key 962.

As presented below, the one-time hash-based signature developed by method 1200 may be validated using the hash-based public key 904 as shown and described presently in reference to FIG. 13.

Figure 13:
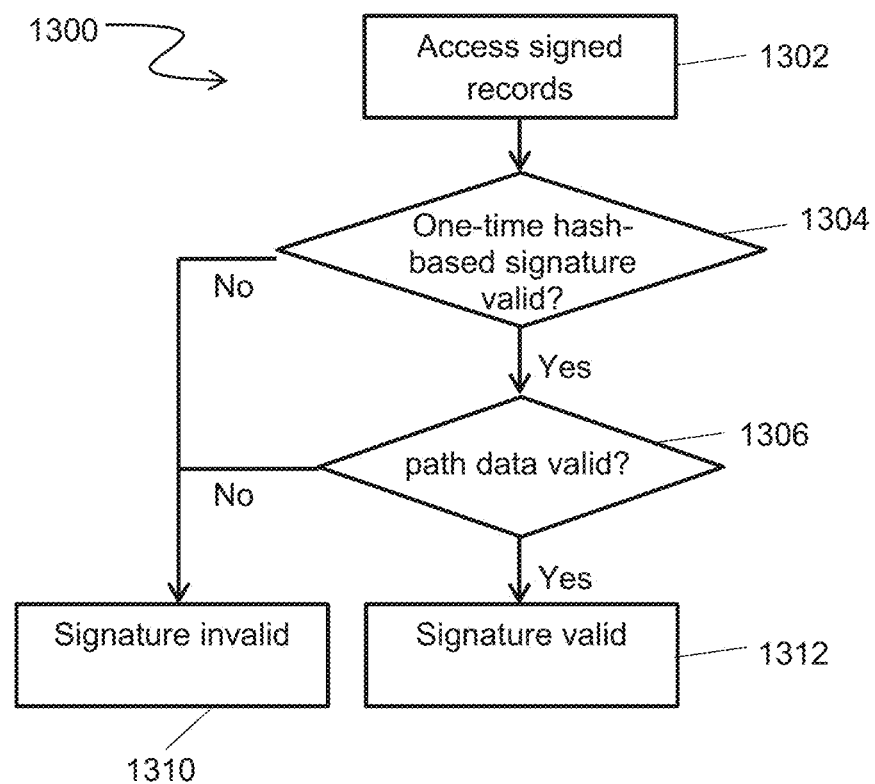
FIG. 13 is a flowchart illustrating a method of validating a one-time hash-based signature on a synthesized public key according to some embodiments.

FIG. 13 is a flowchart illustrating a method 1300 of validating a one-time hash-based signature on a synthesized public key according to some embodiments. In general, method 1300 may be implemented by a client computer (e.g., a browser executing thereon) to validate a synthesized public key 906, which itself is used to sign internet data records 908 in a PKI scheme. Such a client computer (or browser) may therefore include validation logic that performs the blocks of FIG. 13.

At block 1302, method 1300 accesses an internet data record 908 for which the signature is to be validated. Method 1300 may form the internet data record 908 anew, or may access it in its totality. The particular way that method 1300 accesses the internet data record 908 depends on the context. For DNSSEC 910, method 1300 may access a RRset that contains a ZSK 914 by retrieving it from a DNS server, for example. For a certification authority 918, or a certification authority combined with a delegated certificate status responder 934, method 1300 accesses the signed portion of a respective certificate 924. For a certificate status responder 926, method 1300 accesses certificate content 924 or a status responder public key 930. For an identity provider 942, method 1300 accesses authentication assertion content 948. For a code signer 950, method 1300 accesses a software image 956 (e.g., code or a hash of code). For a payment authority 958, method 1300 accesses a payment transaction 964. Method 1300 may represent the accessed internet data record 908 as a binary sequence $(b_i)_{1 \le i \le k}$.

At block 1304, method 1300 validates the one-time hash-based signature on the synthesized public key 906. To do this, method 1300 parses the internet data record 908 accessed per block 1302 to extract sig=(sig$_1$∥sig$_2$∥ . . . ∥sig$_k$), which may have been produced according to block 1208 of method 1200, the one-time hash-based public key 904, and the path data as produced according to block 1208 of FIG. 12. Next, for each 1≤i≤k, method 1300 checks the hash value H(sig$_i$). That is, for each 1≤i≤k, the method checks whether the following holds: if $b_i$=0, then H(sig$_i$)=$Y_{i0}$, otherwise H(sig$_i$)=$Y_{i1}$. If this holds for all i, then the method proceeds to block 1306. Otherwise, method 1300 proceeds to block 1310, indicates that the signature is invalid, and halts. Note that in embodiments, portions of the one-time public key may be reconstructed from respective portions of the one-time hash-based signature rather than checking them at this block, where the effect of checking is accomplished indirectly through the validation of the path data in conjunction with the reconstructed portions.

At block 1306, the method validates the path data provided per block 1208 of method 1200. Method 1300 then parses the record to extract the path data. The actions of this block are similar to those of block 506 of FIG. 5. Namely, the actions of block 1306 use the path data and the hash of the one-time hash-based public key to re-construct a portion of the recursive hash tree up to and including the root. Thus, at the bottom level of the recursive hash tree, the method combines the hash of the one-time public key extracted from the signature with the hashed one-time public key of its sibling node, obtained from the path data. The method hashes the resulting combination, which, if correct, will equal the parent node of both nodes. At each subsequent level of the recursive hash tree, the actions of this block combine the hash so far accumulated with the data of the next respective sibling node as obtained from the path data in the signature, and hash the result. The process proceeds up the tree until the root node is reached.

Once the process re-derives the hash value of the root node and confirms that it matches the hash value of the actual root node as published as a one-time hash-based public key 904, the method 1300 proceeds to block 1312, outputs an indication of signature validity, and halts. Otherwise the process proceeds to block 1310, indicates that the signature is invalid, and halts.

Other one-time hash-based signature schemes may be combined with a recursive hash tree in some embodiments, and other hash-based signature schemes may also be employed in connection with the hash-based public key 904 and/or for signing the synthesized public key 906 in variants. In particular, modes such as the Leighton-Micali Signature (LMS) system, eXtended Merkle Signature Scheme (XMSS) and SPHINCS are acceptable in terms of their security assurances and efficiency, and would be appropriate alternatives to the scheme described herein. Both stateful and stateless modes may be employed, as well as modes based on "few-time" signature schemes.

According to some embodiments, non-hash-based signature schemes may be employed instead of schemes involving a hash-based public key 904 for signing the synthesized public key 906. The non-hash-based signature schemes may be quantum-computer resistant, a.k.a., post-quantum-computer (e.g., the BLISS scheme, developed by Ducas, Durmus, Lepoint, and Lyubashevsky), or standard, pre-quantum-computer signature schemes (e.g., ElGamal, RSA, and variants thereof). For example, related to the observation described above in connection with DNSSEC, some embodiments combine the method described in FIGS. 10 and 11 with a conventional signature algorithm for signing the synthesized public key 906. Some embodiments combine the method described in FIGS. 10 and 11 (as well as FIGS. 4 and 5 above) with a non-hash-based algorithm for signing the synthesized public key 906. In such embodiments, the size overhead of the signature on the synthesized public key 906 is amortized across the batch. This may be helpful for efficiency if the size overhead is large. In addition, the hierarchical structure may reduce the number of signatures that are made with the conventional or non-hash-based signature algorithm, compared to a direct application of the signature algorithm to internet records. This may be helpful for security if the maximum number of signatures that can be made with the algorithm is limited. Note also that such embodiments may maintain architectural consistency with existing PKIs, in that the synthesized public key takes the place of a conventional public key.

IV. Batching Internet Data Records

"Batching" refers to a process for selecting internet data records 908 for use as leaf nodes of a recursive hash tree as disclosed herein. Batching may be applied as part of block 1004 of FIG. 10. That is, if the internet data records 908 are known or determinable in advance, the synthesized public key 906 can be derived therefrom using a recursive hash tree as shown and described above in reference to FIG. 10. Moreover, the size of the tree can be selected to improve performance of an embodiment.

In general, when multiple signatures by a given signer will be verified by a relying party, batch signatures can significantly reduce effective average signature size. Assume, by way of illustrative example, that the relying party verifies 100 signatures by a given signer in a single day. If signatures are produced individually using a conventional hash-based scheme with tree depth of twenty, then each signature will be about 14 K bits with a typical known scheme such as LMS, with 9 K bits for the one-time signature and 5 K bits for the sibling path data. However, if signatures are produced according to the disclosed techniques (e.g., method 1000 with d=20) and the synthesized public key 906 is signed using the disclosed techniques (e.g., using a one-time hash-based public key 904 as part of method 1200), then the effective average signature size is only about 5.2 K bits. This estimate includes about 5.1 K bits for the batch signature plus about 0.14 K bits for the amortized cost of the one-time hash-based signature (i.e., 14 K/100). The signatures will be even smaller is the tree depth and/or batch size is reduced.

If the batches are too large, the overall signing latency may be excessive due to waiting for a full batch to be assembled. However, if the batches are too small, then the overhead from the one-time hash-based signature will be amortized over fewer verified internet data records 908, so the effective average size may be excessive. The tradeoff depends in part on the expected fraction of total internet data records 908 that are signed by the signer that are also verified by a relying party. When this fraction is small, small batches are better because the overhead from the one-time hash-based signature is effectively a large constant, and most of the signature size is due to the sibling path data through the batch signature tree. When this fraction is small-to-medium, large batches are better because the overhead from the one-time hash-based signature is amortized across more internet data records 908. When this fraction is large, small batches successively become better again because the overhead becomes effectively zero.

Batching may be adaptive and/or predictive. Here, "adaptive" means specific to a relying party, and "predictive" means anticipating future activity. Thus, adaptive batching may assemble records in a manner customized to improve performance for particular relying parties (in which case the same records may appear in multiple batches). Predictive batching may assemble records that are have not been explicitly requested for signature, but that are instead created in anticipation that they may be requested. Because messages can be assembled into multiple batches, different relying parties can be given signatures from different batches. A factor in deciding upon batch sizes is a balance between overhead and latency for a relying party over some time period. Predictive and adaptive batching for signatures contrasts with prior art approaches where a server gives the same signatures to all relying parties. For example a server according to some embodiments may provide different signatures according to which batch public keys the relying party already has, or would benefit from having in the future.

According to some embodiments, a given internet data record 908 may be part of multiple batches, i.e., multiple synthesized public keys 906 may be derived from the same internet data record 908. A signer may continually produce new batches and thus new synthesized public keys from a set of internet data records 908, which may also continually be changing, in order to optimize system performance according to various metrics including signature size, signature validation time, and latency. A signer may also produce both a full hash-based signature and a two-level signature according to the methods disclosed herein on the same internet data record 908, to provide another tradeoff between the various metrics, to have the latency benefits of the full hash-based signature, which can be produced immediately, and the size benefits of the two-level signature, which can be produced separately once the remainder of the batch is available.

The following provides an example of a server/relying party exchange. A server wants to provide a signature on some internet data record 908 to a relying party. If the relying party already has the public key for a batch that includes the internet data record 908, then server may provide a signature from that batch. If the relying party lacks an appropriate public key, then the server selects a "suitable" batch that includes the internet data record 908 and provides a signature from that batch, plus a one-time hash-based signature (e.g., produced by method 1200) on the batch public key (e.g., synthesized public key 906). "Suitability" criteria are presented below. Note that in some embodiments, the actual signer is separate from the server (e.g., the signer is certification authority). Thus, rather than a server providing signatures, public key, etc., the relying party could obtain these items directly from the signer.

"Suitability" depends on the particular adaptive and/or predictive approach. At issue is what approach gives the "best" ongoing outcome for a relying party. The answer may depend on analysis of multiple factors including, by way of non-limiting example, the relying party's profile, internet traffic patterns, particular use cases, and geography. Batches can be designed on a per-relying-party basis. For larger scales, batches may be designed so that they are likely to be more suitable groups of similar users, e.g., users interacting with a similar set of web sites and/or running a similar set of applications. The relying party can still verify the signatures, even if the suitability analysis is not optimal, but may have to have to process longer signatures, or wait longer for them to arrive.

A non-limiting example of an adaptive batching technique follows. If a web server wants to present its certificate to a web client, the web server can obtain multiple different certificates from a certification authority, where the different certificates comprise the same or similar certificate content but correspond to different batches, i.e., different hash trees and thus different signatures and synthesized public keys, and present the certificate that is most likely to be in the same batch or tree as certificates presented by other web servers to the same web client. This reduces the number of synthesized public keys that the web client has to obtain, and therefore the overhead of the hash-based signatures.

A non-limiting example of a predictive batching technique follows. A signer may proactively synthesize a public key based on selected internet data records 908 that are anticipated. Such anticipation may include multiple inconsistent status indicators (e.g., valid and invalid, current and expired, etc.) for one or more certificates over a time period. The anticipated data elements may or may not actually turn out to be valid (e.g., a certificate might be revoked before a given time period arrives), but the synthesis is nevertheless performed optimistically in order to reduce the overhead for the full set. This can be particularly helpful for a certificate status responder 926, where the set of potential answers is known in advance, but actual answers do not need to be released until a particular point in time. In general, batches may be designed to include multiple status indicators for the same certificate over different time periods, and/or multiple status indicators for different certificates over the same time period.

Proactive synthesis may also be helpful for pre-computing signatures on a variety of internet data records. For example, signatures may be generated for certificates that may or may not be renewed at a future point in time. This may be beneficial for short-lived certificates, which are typically renewed more frequently than long-lived certificates. Proactive synthesis may also be helpful for pre-computing signatures on DNSSEC records that may or may not be issued. It may also be beneficial to generate signatures on authentication assertions that may or may not be issued a future point in time, and if issued, that may contain a variety of potential attribute values. It may also be beneficial to generate signatures on software images that may or may not be released and on payment transactions that may or may not occur, and, if they do occur, may contain a variety of potential transaction amounts or payees.

In some embodiments, an anticipated data element may comprise an unpredictable nonce value, to make it more difficult for an adversary to infer the data element before it is released, and thereby potentially also infer its signature from previously released sibling path data. In OCSP, for example, the unpredictable nonce may be conveyed as an optional extension in a status response. The nonce may similarly be conveyed within a certificate, authentication assertion, software image, or payment transaction, with the specific location dependent on the particular syntax. Alternatively, a data element may be set up as an unpredictable dummy value to make it difficult to infer its corresponding leaf node, and thereby to infer a signature on its sibling node. Similarly, the leaf node itself may be replaced with an unpredictable dummy value.

In embodiments that employ a nonce and/or dummy value, the ability for an entity to provide a valid signature on an internet record may depend on the entity's knowledge of the unpredictable nonce and/or the dummy value. Because these items may be different for each potential response, the signer may delegate the ability to provide potential responses to another entity by providing the appropriate items, e.g., the unpredictable nonces and/or the dummy values associated with the potential status responses for a given time period, certificate, attribute value, status indicator, etc., to the entity, and other sibling path data. The entity may then interact directly with a requester on behalf of the signer to provide the actual signed internet record. This may be helpful for both availability and security, because additional entities may interact directly with requesters, while the signer itself may interact only with the additional entities. To reduce the risk of a potential compromise, the signer may provide the entity the items associated with a given time period only immediately prior to the time period. To reduce the scope of a potential compromise, the signer may delegate items associated with different certificates to different entities. In some embodiments, the signer may generate and store the unpredictable nonces and/or the dummy values. In other embodiments, the signer may derive the items from a secret key and distinguishing information such as the time period, certificate, attribute value, status indicator, etc.

Certain embodiments can be performed as a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of electronically signing a plurality of internet data records, the method comprising:
   accessing, using at least one electronic processor, the plurality of internet data records;
   generating, using the at least one electronic processor, a plurality of leaf nodes from the plurality of internet data records;
   constructing, using the at least one electronic processor, a recursive hash tree from the plurality of leaf nodes, the recursive hash tree comprising a plurality of nodes, the plurality of nodes comprising the plurality of leaf nodes and a root node, wherein a first subset of nodes of the plurality of nodes each comprise a leaf node and a second subset of nodes of the plurality of nodes each comprise a hash of data comprising one or more child nodes;
   deriving, using the at least one electronic processor, information sufficient to validate the root node based on the root node or a hash of the root node;
   publishing, in an internet public key infrastructure (PKI) as a synthesized public key, the information sufficient to validate the root node;
   providing, through the internet and as a signature on at least one internet data record of the plurality of internet data records, validation data from the recursive hash tree, wherein the at least one internet data record of the plurality of internet data records is validatable using at least the validation data and the synthesized public key by reconstructing a portion of the recursive hash tree up to and including the root node using the validation data to obtain an accumulated hash value and determining that the signature on the at least one internet data record of the plurality of internet data records is valid by confirming that the accumulated hash value is consistent with the synthesized public key.

2. The method of claim 1, wherein the generating the plurality of leaf nodes comprises assembling the plurality of internet data records into leaf node batches using at least one of adaptive batch assembly or predictive batch assembly.

3. The method of claim 1, further comprising:
   obtaining a signature on the synthesized public key; and
   publishing on the internet a public key for validating the signature on the synthesized public key.

4. The method of claim 3:
   wherein the obtaining the signature on the synthesized public key comprises obtaining a hash-based signature on the synthesized public key, wherein the obtaining the hash-based signature comprises generating a second recursive hash tree comprising a leaf node comprising a set of random numbers;
   wherein the method further comprises providing the hash-based signature to at least one entity over the internet;
   wherein the method further comprises deriving information sufficient to validate a second root node of the second recursive hash tree; and
   wherein the publishing on the internet the public key for validating the signature on the synthesized public key comprises publishing on the internet, as a public key for validating the hash-based signature, the information sufficient to validate the second root node of the second recursive hash tree.

5. The method of claim 3, wherein:
   the publishing, in the internet PKI as the synthesized public key, the information sufficient to validate the root node, and the providing, through the internet and as the signature on the at least one internet data record of the plurality of internet data records, the validation data from the recursive hash tree, are performed by a certification authority;
   the plurality of internet data records comprise a plurality of digital certificate contents;
   the plurality of leaf nodes comprise cryptographic hashes of the plurality of digital certificate contents;
   the synthesized public key is published as an intermediate-level certification authority public key; and
   the public key for validating the signature on the synthesized public key is published as a higher-level certification authority public key.

6. The method of claim 5, further comprising:
   accessing a plurality of electronically stored Online Certificate Status Protocol (OCSP) certificate status data records;
   generating a second plurality of leaf nodes from the plurality of OCSP certificate status data records;
   constructing a third recursive hash tree, wherein the third recursive hash tree comprises the second plurality of leaf nodes, a third root node, and at least one node comprising a hash of data comprising child nodes;

deriving information sufficient to validate the third root node;

publishing, in the internet PKI and as a synthesized OCSP responder public key, the information sufficient to validate the third root node; and providing, over the internet and as a signature on at least one OCSP certificate status data record of the plurality of OCSP certificate status data records, second validation data comprising sibling path data from the third recursive hash tree, whereby an OCSP client validates the at least one OCSP certificate status data record of the plurality of OCSP certificate status data records using at least the second validation data and the synthesized OCSP responder public key;

wherein the plurality of internet data records further comprise the synthesized OCSP responder public key.

7. The method of claim 3, wherein:

the publishing, in the internet PKI as the synthesized public key, the information sufficient to validate the root node, and the providing, through the internet and as the signature on the at least one internet data record of the plurality of internet data records, the validation data from the recursive hash tree, are performed by an Online Certificate Status Protocol (OCSP) responder;

the plurality of internet data records comprise a plurality of OCSP certificate status data records;

the plurality of leaf nodes comprise cryptographic hashes of the plurality of OCSP certificate status data records;

the synthesized public key is published as an OCSP responder public key; and the public key for validating the signature on the synthesized public key is published as a certification authority public key.

8. The method of claim 7, wherein the plurality of OCSP certificate status data records comprise multiple inconsistent status indicators.

9. The method of claim 3, wherein:

the publishing, in the internet PKI as the synthesized public key, the information sufficient to validate the root node, and the providing, through the internet and as the signature on the at least one internet data record of the plurality of internet data records, the validation data from the recursive hash tree, are performed by an identity provider;

the plurality of internet data records comprise a plurality of authentication assertion contents;

the plurality of leaf nodes comprise cryptographic hashes of the plurality of authentication assertion contents;

the synthesized public key is published as an identity provider public key; and the public key for validating the signature on the synthesized public key is published as an identity provider key validating key.

10. The method of claim 3, wherein:

the publishing, in the internet PKI as the synthesized public key, the information sufficient to validate the root node, and the providing, through the internet and as the signature on the at least one internet data record of the plurality of internet data records, the validation data from the recursive hash tree, are performed by a code signer;

the plurality of internet data records comprise a plurality of software images;

the plurality of leaf nodes comprise cryptographic hashes of the plurality of software images;

the synthesized public key is published as a code signing public key; and the public key for validating the signature on the synthesized public key is published as a code signing key validating key.

11. The method of claim 3, wherein:

the publishing, in the internet PKI as the synthesized public key, the information sufficient to validate the root node, and the providing, through the internet and as the signature on the at least one internet data record of the plurality of internet data records, the validation data from the recursive hash tree, are performed by a payment authority;

the plurality of internet data records comprise a plurality of payment transaction data;

the plurality of leaf nodes comprise cryptographic hashes of the plurality of payment transaction data;

the synthesized public key is published as a payment authority public key; and the public key for validating the signature on the synthesized public key is published as a payment authority key validating key.

12. A system for electronically signing a plurality of internet data records, the system comprising:

at least one electronic processor programmed to perform:
accessing the plurality of internet data records;
generating a plurality of leaf nodes from the plurality of internet data records;
constructing a recursive hash tree from the plurality of leaf nodes, the recursive hash tree comprising a plurality of nodes, the plurality of nodes comprising the plurality of leaf nodes and a root node, wherein a first subset of nodes of the plurality of nodes each comprise a leaf node and a second subset of nodes of the plurality of nodes each comprise a hash of data comprising one or more child nodes;
deriving information sufficient to validate the root node based on the root node or a hash of the root node; and
publishing, in an internet public key infrastructure (PKI) as a synthesized public key, the information sufficient to validate the root node; and at least one electronic server computer configured to perform providing, through the internet and as a signature on at least one internet data record of the plurality of internet data records, validation data from the recursive hash tree, wherein the at least one internet data record of the plurality of internet data records is validatable using at least the validation data and the synthesized public key by reconstructing a portion of the recursive hash tree up to and including the root node using the validation data to obtain an accumulated hash value and determining that the signature on the at least one internet data record of the plurality of internet data records is valid by confirming that the accumulated hash value is consistent with the synthesized public key.

13. The system of claim 12, wherein the generating the plurality of leaf nodes comprises assembling the plurality of internet data records into leaf node batches using at least one of adaptive batch assembly or predictive batch assembly.

14. The system of claim 12, wherein the at least one electronic processor is further programmed to perform:
obtaining a signature on the synthesized public key; and
publishing on the internet a public key for validating the signature on the synthesized public key.

15. The system of claim 14:
wherein the obtaining the signature on the synthesized public key comprises obtaining a hash-based signature on the synthesized public key, wherein the obtaining the hash-based signature comprises generating a second recursive hash tree comprising a leaf node comprising a set of random numbers;
wherein the at least one electronic processor is further programmed to perform providing the hash-based signature to at least one entity over the internet;
wherein the at least one electronic processor is further programmed to perform deriving information sufficient to validate a second root node of the second recursive hash tree; and
wherein the publishing on the internet the public key for validating the signature on the synthesized public key comprises publishing on the internet, as a public key for validating the hash-based signature, the information sufficient to validate the second root node of the second recursive hash tree.

16. The system of claim 14, wherein:
the publishing, in the internet PKI as the synthesized public key, the information sufficient to validate the root node, and the providing, through the internet and as the signature on the at least one internet data record of the plurality of internet data records, the validation data from the recursive hash tree, are performed by a certification authority;
the plurality of internet data records comprise a plurality of digital certificate contents;
the plurality of leaf nodes comprise cryptographic hashes of the plurality of digital certificate contents;
the synthesized public key is published as an intermediate-level certification authority public key; and
the public key for validating the signature on the synthesized public key is published as a higher-level certification authority public key.

17. The system of claim 14,
wherein the at least one electronic processor is further programmed to perform:
accessing a plurality of electronically stored Online Certificate Status Protocol (OCSP) certificate status data records;
generating a second plurality of leaf nodes from the plurality of OCSP certificate status data records;
constructing a third recursive hash tree comprising the second plurality of leaf nodes, a third root node, and at least one node comprising a hash of data comprising child nodes;
deriving information sufficient to validate the third root node; and
publishing, in the internet PKI and as a synthesized OCSP responder public key, the information sufficient to validate the third root node;
wherein the at least one electronic server computer is further configured to perform providing, over the internet and as a signature on at least one OCSP certificate status data record of the plurality of OCSP certificate status data records, second validation data comprising sibling path data from the third recursive hash tree, whereby an OCSP client validates the at least one OCSP certificate status data record of the plurality of OCSP certificate status data records using at least the second validation data and the synthesized OCSP responder public key; and
wherein the plurality of internet data records further comprise the synthesized OCSP responder public key.

18. The system of claim 14, wherein:
the publishing, in the internet PKI as the synthesized public key, the information sufficient to validate the root node, and the providing, through the internet and as the signature on the at least one internet data record of the plurality of internet data records, the validation data from the recursive hash tree, are performed by an Online Certificate Status Protocol (OCSP) responder;
the plurality of internet data records comprise a plurality of OCSP certificate status responses;
the plurality of leaf nodes comprise cryptographic hashes of the plurality of OCSP certificate status responses;
the synthesized public key is published as an OCSP responder public key; and
the public key for validating the signature on the synthesized public key is published as a certification authority public key.

19. The system of claim 18, wherein the plurality of OCSP certificate status responses comprise multiple inconsistent status indicators.

20. The system of claim 14, wherein:
the publishing, in the internet PKI as the synthesized public key, the information sufficient to validate the root node, and the providing, through the internet and as the signature on the at least one internet data record of the plurality of internet data records, the validation data from the recursive hash tree, are performed by an identity provider;
the plurality of internet data records comprise a plurality of authentication assertion contents;
the plurality of leaf nodes comprise cryptographic hashes of the plurality of authentication assertion contents;
the synthesized public key is published as an identity provider public key; and
the public key for validating the signature on the synthesized public key is published as an identity provider key validating key.

21. The system of claim 14, wherein:
the publishing, in the internet PKI as the synthesized public key, the information sufficient to validate the root node, and the providing, through the internet and as the signature on the at least one internet data record of the plurality of internet data records, the validation data from the recursive hash tree, are performed by a code signer;
the plurality of internet data records comprise a plurality of software images;
the plurality of leaf nodes comprise cryptographic hashes of the plurality of software images;
the synthesized public key is published as a code signing public key; and
the public key for validating the signature on the synthesized public key is published as a code signing key validating key.

22. The system of claim 14, wherein:
the publishing, in the internet PKI as the synthesized public key, the information sufficient to validate the root node, and the providing, through the internet and as the signature on the at least one internet data record of the plurality of internet data records, the validation data from the recursive hash tree, are performed by a payment authority;
the plurality of internet data records comprise a plurality of payment transaction data;
the plurality of leaf nodes comprise cryptographic hashes of the plurality of payment transaction data;

the synthesized public key is published as a payment authority public key; and the public key for validating the signature on the synthesized public key is published as a payment authority key validating key.

* * * * *